United States Patent
Takeda et al.

(10) Patent No.: US 8,171,123 B2
(45) Date of Patent: *May 1, 2012

(54) NETWORK BANDWIDTH DETECTION AND DISTRIBUTION

(75) Inventors: Yutaka Takeda, San Mateo, CA (US); James E. Marr, Burlingame, CA (US); Stephen C. Detwiler, Oakland, CA (US); Attila Vass, Foster City, CA (US); Payton R. White, Foster City, CA (US)

(73) Assignee: Sony Computer Entertainment Inc., Tokyo (JP)

( * ) Notice: Subject to any disclaimer, the term of this patent is extended or adjusted under 35 U.S.C. 154(b) by 541 days.

This patent is subject to a terminal disclaimer.

(21) Appl. No.: 12/267,254

(22) Filed: Nov. 7, 2008

(65) Prior Publication Data
US 2009/0144424 A1 Jun. 4, 2009

Related U.S. Application Data

(60) Provisional application No. 60/992,295, filed on Dec. 4, 2007, provisional application No. 60/992,282, filed on Dec. 4, 2007.

(51) Int. Cl.
*G06F 15/173* (2006.01)
(52) U.S. Cl. ........ 709/223; 709/217; 709/218; 709/219; 709/224
(58) Field of Classification Search .......... 709/217–219, 709/223, 224
See application file for complete search history.

(56) References Cited

U.S. PATENT DOCUMENTS

| | | | |
|---|---|---|---|
| 4,764,928 A | 8/1988 | Akerberg | |
| 4,787,051 A | 11/1988 | Olson | |
| 4,843,568 A | 6/1989 | Krueger | |
| 5,128,671 A | 7/1992 | Thomas, Jr. | |
| 5,528,265 A | 6/1996 | Harrison | |
| 5,544,325 A | 8/1996 | Denny et al. | |
| 5,596,720 A | 1/1997 | Hamada et al. | |
| 5,630,184 A | 5/1997 | Roper et al. | |

(Continued)

FOREIGN PATENT DOCUMENTS

EP  0 913 965  5/1999

(Continued)

OTHER PUBLICATIONS

Arno Wacker et al—"A NAT Traversal Mechanism for Peer-to Peer Networks"—Eighth International Conference on Peer-to Peer Computing (P2P'08), 2008. IEEE. pp. 81-83.

(Continued)

*Primary Examiner* — Yasin Barqadle
*Assistant Examiner* — Van Kim T Nguyen
(74) *Attorney, Agent, or Firm* — Joshua D. Isenberg; JDI Patent

(57) ABSTRACT

In a node configured to communicate with one or more other nodes over a network, available bandwidth for network traffic may be distributed among two or more distinct channels of communication within a single application running on the node. An available bandwidth may be detected for communication between the first node and a second node. A distribution may be determined for the available bandwidth among the two or more communication channels. A sending rate may be adjusted for data sent from the first node to the second node over one or more of the two or more communication channels in response to a detected change in the available bandwidth.

17 Claims, 9 Drawing Sheets

U.S. PATENT DOCUMENTS

| | | |
|---|---|---|
| 5,636,216 A | 6/1997 | Fox et al. |
| 5,701,427 A | 12/1997 | Lathrop |
| 5,768,382 A | 6/1998 | Schneier et al. |
| 5,768,531 A | 6/1998 | Lin |
| 5,793,763 A | 8/1998 | Mayes et al. |
| 5,809,016 A | 9/1998 | Kreitzer et al. |
| 5,812,531 A | 9/1998 | Cheung et al. |
| 5,835,726 A | 11/1998 | Shwed et al. |
| 5,856,972 A | 1/1999 | Riley et al. |
| 5,898,679 A | 4/1999 | Brederveld et al. |
| 5,956,485 A | 9/1999 | Perlman |
| 6,012,096 A | 1/2000 | Link et al. |
| 6,058,431 A | 5/2000 | Srisuresh et al. |
| 6,128,623 A | 10/2000 | Mattis et al. |
| 6,128,624 A | 10/2000 | Papierniak et al. |
| 6,128,627 A | 10/2000 | Mattis et al. |
| 6,128,664 A | 10/2000 | Yanagidate et al. |
| 6,151,584 A | 11/2000 | Papierniak et al. |
| 6,151,601 A | 11/2000 | Papierniak et al. |
| 6,152,824 A | 11/2000 | Rothschild et al. |
| 6,157,368 A | 12/2000 | Faeger |
| 6,208,649 B1 | 3/2001 | Kloth |
| 6,209,003 B1 | 3/2001 | Mattis et al. |
| 6,212,565 B1 | 4/2001 | Gupta |
| 6,212,633 B1 | 4/2001 | Levy et al. |
| 6,289,358 B1 | 9/2001 | Mattis et al. |
| 6,292,880 B1 | 9/2001 | Mattis et al. |
| 6,327,630 B1 | 12/2001 | Carroll et al. |
| 6,333,931 B1 | 12/2001 | LaPier et al. |
| 6,349,210 B1 | 2/2002 | Li |
| 6,353,891 B1 | 3/2002 | Borella et al. |
| 6,375,572 B1 | 4/2002 | Masuyama |
| 6,389,462 B1 | 5/2002 | Cohen et al. |
| 6,393,488 B1 | 5/2002 | Araujo |
| 6,405,104 B1 | 6/2002 | Dougherty |
| 6,421,347 B1 | 7/2002 | Borgstahl et al. |
| 6,487,583 B1 | 11/2002 | Harvey et al. |
| 6,487,600 B1 | 11/2002 | Lynch |
| 6,535,511 B1 | 3/2003 | Rao |
| 6,549,786 B2 | 4/2003 | Cheung et al. |
| 6,553,515 B1 | 4/2003 | Gross et al. |
| 6,581,108 B1 | 6/2003 | Denison et al. |
| 6,590,865 B1 | 7/2003 | Ibaraki et al. |
| 6,616,531 B1 | 9/2003 | Mullins |
| 6,618,757 B1 | 9/2003 | Babbitt et al. |
| 6,636,898 B1 | 10/2003 | Ludovici et al. |
| 6,640,241 B1 | 10/2003 | Ozzie et al. |
| 6,641,481 B1 | 11/2003 | Mai et al. |
| 6,667,972 B1 | 12/2003 | Foltan et al. |
| 6,668,283 B1 | 12/2003 | Sitaraman et al. |
| 6,690,678 B1 * | 2/2004 | Basso et al. ............. 370/468 |
| 6,701,344 B1 | 3/2004 | Holt et al. |
| 6,704,574 B2 | 3/2004 | Lin |
| 6,712,697 B2 | 3/2004 | Acres |
| 6,757,255 B1 * | 6/2004 | Aoki et al. ............. 370/252 |
| 6,772,219 B1 | 8/2004 | Shobatake |
| 6,779,017 B1 | 8/2004 | Lamberton et al. |
| 6,779,035 B1 | 8/2004 | Gbadegesin |
| 6,789,126 B1 | 9/2004 | Saulpaugh et al. |
| 6,799,255 B1 | 9/2004 | Blumenau et al. |
| 6,807,575 B1 | 10/2004 | Emaru et al. |
| 6,816,703 B1 | 11/2004 | Wood et al. |
| 6,829,634 B1 | 12/2004 | Holt et al. |
| 6,848,997 B1 | 2/2005 | Hashimoto et al. |
| 6,891,801 B1 | 5/2005 | Herzog |
| 6,899,628 B2 | 5/2005 | Leen et al. |
| 6,920,501 B2 | 7/2005 | Chu et al. |
| 6,978,294 B1 | 12/2005 | Adams et al. |
| 7,000,025 B1 * | 2/2006 | Wilson ............. 709/235 |
| 7,016,942 B1 | 3/2006 | Odom |
| 7,017,138 B2 | 3/2006 | Zirojevic et al. |
| 7,035,911 B2 | 4/2006 | Lowery et al. |
| 7,043,641 B1 | 5/2006 | Martinek et al. |
| 7,065,579 B2 | 6/2006 | Traversat et al. |
| 7,082,316 B2 | 7/2006 | Eiden et al. |
| 7,096,006 B2 | 8/2006 | Lai et al. |
| 7,107,348 B2 | 9/2006 | Shimada et al. |
| 7,120,429 B2 | 10/2006 | Minear et al. |
| 7,123,608 B1 | 10/2006 | Scott et al. |
| 7,127,613 B2 | 10/2006 | Pabla et al. |
| 7,130,921 B2 | 10/2006 | Goodman et al. |
| 7,133,368 B2 | 11/2006 | Zhang et al. |
| 7,134,961 B2 | 11/2006 | Hora |
| 7,155,515 B1 | 12/2006 | Brown et al. |
| 7,155,518 B2 | 12/2006 | Forslow |
| 7,168,089 B2 | 1/2007 | Nguyen et al. |
| 7,174,382 B2 | 2/2007 | Ramanathan et al. |
| 7,177,950 B2 | 2/2007 | Narayan et al. |
| 7,177,951 B1 | 2/2007 | Dykeman et al. |
| 7,185,138 B1 * | 2/2007 | Galicki ............. 710/316 |
| 7,194,654 B2 | 3/2007 | Wray et al. |
| 7,197,565 B2 | 3/2007 | Abdelaziz et al. |
| 7,203,841 B2 | 4/2007 | Jackson et al. |
| 7,216,359 B2 | 5/2007 | Katz et al. |
| 7,240,093 B1 | 7/2007 | Danieli et al. |
| 7,243,141 B2 | 7/2007 | Harris |
| 7,254,709 B1 | 8/2007 | Richard |
| 7,263,070 B1 | 8/2007 | Delker et al. |
| 7,272,636 B2 | 9/2007 | Pabla |
| 7,321,928 B2 | 1/2008 | Feltin et al. |
| 7,340,500 B2 | 3/2008 | Traversat et al. |
| 7,346,015 B2 | 3/2008 | Shipman |
| 7,392,375 B2 | 6/2008 | Bartram et al. |
| 7,398,388 B2 | 7/2008 | Xu et al. |
| 7,407,434 B2 | 8/2008 | Thomas et al. |
| 7,429,215 B2 | 9/2008 | Rozkin et al. |
| 7,451,490 B2 | 11/2008 | Pirich et al. |
| 7,457,279 B1 | 11/2008 | Scott et al. |
| 7,489,631 B2 * | 2/2009 | Ilan ............. 370/230.1 |
| 7,533,172 B2 | 5/2009 | Traversat et al. |
| 7,573,886 B1 * | 8/2009 | Ono ............. 370/395.2 |
| 7,680,047 B2 * | 3/2010 | Vadlakonda et al. ......... 370/235 |
| 7,788,354 B2 * | 8/2010 | Nag ............. 709/223 |
| 7,803,052 B2 | 9/2010 | Multerer et al. |
| 7,859,998 B2 * | 12/2010 | Wade et al. ............. 370/230 |
| 2001/0005368 A1 | 6/2001 | Rune |
| 2001/0017856 A1 | 8/2001 | Asokan et al. |
| 2001/0021188 A1 | 9/2001 | Fujimori et al. |
| 2001/0044339 A1 | 11/2001 | Cordero et al. |
| 2001/0046213 A1 | 11/2001 | Sakoda |
| 2002/0002074 A1 | 1/2002 | White et al. |
| 2002/0006114 A1 | 1/2002 | Bjelland et al. |
| 2002/0013838 A1 | 1/2002 | Kushida et al. |
| 2002/0016826 A1 | 2/2002 | Johansson et al. |
| 2002/0035604 A1 | 3/2002 | Cohen et al. |
| 2002/0055989 A1 | 5/2002 | Stringer-Calvert et al. |
| 2002/0075844 A1 | 6/2002 | Hagen |
| 2002/0085097 A1 | 7/2002 | Colmenarez et al. |
| 2002/0097732 A1 | 7/2002 | Worster et al. |
| 2002/0107786 A1 | 8/2002 | Lehmann-Haupt et al. |
| 2002/0107935 A1 | 8/2002 | Lowery et al. |
| 2002/0119821 A1 | 8/2002 | Sen et al. |
| 2002/0138471 A1 | 9/2002 | Dutta et al. |
| 2002/0143855 A1 | 10/2002 | Traversat et al. |
| 2002/0147810 A1 | 10/2002 | Traversat et al. |
| 2002/0161821 A1 | 10/2002 | Narayan et al. |
| 2002/0183004 A1 | 12/2002 | Fulton et al. |
| 2002/0184310 A1 | 12/2002 | Traversat et al. |
| 2002/0184311 A1 | 12/2002 | Traversat et al. |
| 2003/0027634 A1 | 2/2003 | Matthews, III |
| 2003/0028585 A1 | 2/2003 | Yeager et al. |
| 2003/0045359 A1 | 3/2003 | Leen et al. |
| 2003/0046292 A1 | 3/2003 | Subramanian et al. |
| 2003/0051052 A1 | 3/2003 | Shteyn et al. |
| 2003/0055892 A1 | 3/2003 | Huitema et al. |
| 2003/0055978 A1 | 3/2003 | Collins |
| 2003/0079003 A1 | 4/2003 | Burr |
| 2003/0084282 A1 | 5/2003 | Taruguchi |
| 2003/0097408 A1 | 5/2003 | Kageyama et al. |
| 2003/0104829 A1 | 6/2003 | Alzoubi et al. |
| 2003/0115258 A1 | 6/2003 | Baumeister et al. |
| 2003/0126229 A1 | 7/2003 | Kantor et al. |
| 2003/0126245 A1 | 7/2003 | Feltin et al. |
| 2003/0135625 A1 | 7/2003 | Fontes et al. |
| 2003/0152034 A1 | 8/2003 | Zhang et al. |
| 2003/0158961 A1 | 8/2003 | Nomura et al. |
| 2003/0162556 A1 | 8/2003 | Libes |

| | | |
|---|---|---|
| 2003/0177187 A1 | 9/2003 | Levine et al. |
| 2003/0182421 A1 | 9/2003 | Faybishenko et al. |
| 2003/0182428 A1 | 9/2003 | Li et al. |
| 2003/0191828 A1 | 10/2003 | Ramanathan et al. |
| 2003/0217096 A1 | 11/2003 | McKelvie et al. |
| 2003/0217135 A1 | 11/2003 | Chatani et al. |
| 2003/0223430 A1 | 12/2003 | Lodha ............... 370/395.41 |
| 2003/0227939 A1 | 12/2003 | Yukie et al. |
| 2003/0229779 A1 | 12/2003 | Morais et al. |
| 2003/0229789 A1 | 12/2003 | Morais et al. |
| 2003/0233281 A1 | 12/2003 | Takeuchi et al. |
| 2004/0007618 A1 | 1/2004 | Oram et al. |
| 2004/0015548 A1 | 1/2004 | Lee |
| 2004/0018839 A1 | 1/2004 | Andric et al. |
| 2004/0024879 A1 | 2/2004 | Dingman et al. |
| 2004/0063497 A1 | 4/2004 | Gould |
| 2004/0085947 A1 | 5/2004 | Ekberg et al. |
| 2004/0087369 A1 | 5/2004 | Tanaka |
| 2004/0088369 A1 | 5/2004 | Yeager et al. |
| 2004/0103179 A1 | 5/2004 | Damm et al. |
| 2004/0110563 A1 | 6/2004 | Tanaka |
| 2004/0133631 A1 | 7/2004 | Hagen et al. |
| 2004/0139228 A1 | 7/2004 | Takeda et al. |
| 2004/0162871 A1 | 8/2004 | Pabla et al. |
| 2004/0181463 A1 | 9/2004 | Goldthwaite et al. |
| 2004/0207880 A1 | 10/2004 | Thakur |
| 2004/0212589 A1 | 10/2004 | Hall et al. |
| 2004/0236863 A1 | 11/2004 | Shen et al. |
| 2004/0236945 A1 | 11/2004 | Risan et al. |
| 2004/0243665 A1 | 12/2004 | Markki et al. |
| 2004/0249891 A1 | 12/2004 | Khartabil et al. |
| 2004/0254977 A1 | 12/2004 | Zhang |
| 2004/0267876 A1 | 12/2004 | Kakivaya et al. |
| 2005/0007964 A1 | 1/2005 | Falco et al. |
| 2005/0015626 A1 | 1/2005 | Chasin |
| 2005/0020354 A1 | 1/2005 | Nguyen et al. |
| 2005/0026698 A1 | 2/2005 | Pirich et al. |
| 2005/0063409 A1 | 3/2005 | Oommen |
| 2005/0064939 A1 | 3/2005 | McSheffrey et al. |
| 2005/0065632 A1 | 3/2005 | Douglis et al. |
| 2005/0080858 A1 | 4/2005 | Pessach |
| 2005/0086287 A1 | 4/2005 | Datta |
| 2005/0086288 A1 | 4/2005 | Datta et al. |
| 2005/0086329 A1 | 4/2005 | Datta et al. |
| 2005/0086350 A1 | 4/2005 | Mai |
| 2005/0086369 A1 | 4/2005 | Mai et al. |
| 2005/0105526 A1 | 5/2005 | Stiemerling et al. |
| 2005/0141522 A1 | 6/2005 | Kadar et al. |
| 2005/0149481 A1 | 7/2005 | Hesselink et al. |
| 2005/0221858 A1 | 10/2005 | Hoddie |
| 2005/0250487 A1 | 11/2005 | Miwa |
| 2005/0251577 A1 | 11/2005 | Guo et al. |
| 2005/0259637 A1 | 11/2005 | Chu et al. |
| 2005/0262411 A1 | 11/2005 | Vertes |
| 2006/0063587 A1 | 3/2006 | Manzo |
| 2006/0067290 A1 | 3/2006 | Miwa |
| 2006/0068702 A1 | 3/2006 | Miwa |
| 2006/0075127 A1 | 4/2006 | Juncker et al. |
| 2006/0084504 A1 | 4/2006 | Chan et al. |
| 2006/0111979 A1 | 5/2006 | Chu |
| 2006/0209822 A1 | 9/2006 | Hamamoto |
| 2006/0218624 A1 | 9/2006 | Ravikumar et al. |
| 2006/0288103 A1 | 12/2006 | Gobara et al. |
| 2007/0058792 A1 | 3/2007 | Chaudhari et al. |
| 2007/0061460 A1 | 3/2007 | Khan et al. |
| 2007/0077981 A1 | 4/2007 | Hungate et al. |
| 2007/0150552 A1 | 6/2007 | Harris et al. |
| 2007/0165629 A1 | 7/2007 | Chaturvedi et al. |
| 2007/0191109 A1 | 8/2007 | Crowder et al. |
| 2007/0198418 A1 | 8/2007 | MacDonald et al. |
| 2007/0208748 A1 | 9/2007 | Li |
| 2007/0213124 A1 | 9/2007 | Walker et al. |
| 2007/0217436 A1 | 9/2007 | Markley et al. |
| 2007/0237153 A1 | 10/2007 | Slaughter et al. |
| 2008/0298376 A1 | 12/2008 | Takeda et al. ............ 370/400 |
| 2009/0077245 A1 | 3/2009 | Smelyansky et al. |
| 2009/0094370 A1 | 4/2009 | Jacob et al. |
| 2009/0111532 A1 | 4/2009 | Salokannel et al. |
| 2009/0138610 A1 | 5/2009 | Gobara et al. |
| 2009/0144423 A1 | 6/2009 | Marr ........................ 709/226 |
| 2009/0144425 A1 | 6/2009 | Marr ........................ 709/226 |
| 2009/0228593 A1 | 9/2009 | Takeda |
| 2009/0240821 A1 | 9/2009 | Juncker et al. |
| 2010/0039937 A1* | 2/2010 | Ramanujan et al. ........ 370/232 |

FOREIGN PATENT DOCUMENTS

| | | |
|---|---|---|
| EP | 1 107 508 | 6/2001 |
| EP | 1 374 959 | 5/2003 |
| FR | 2829648 | 3/2003 |
| JP | 2001 53901 | 2/2001 |
| JP | 2002 10321 | 1/2002 |
| JP | 2004 135778 | 5/2004 |
| JP | 2004 136009 | 5/2004 |
| JP | 2004 141225 | 5/2004 |
| JP | 2005 319047 | 11/2005 |
| JP | 2005 323116 | 11/2005 |
| JP | 2005 323117 | 11/2005 |
| WO | WO 99/35799 | 7/1999 |
| WO | WO 01/97485 | 12/2001 |
| WO | WO 02/03217 | 1/2002 |
| WO | 02/11366 | 2/2002 |
| WO | WO 02/23822 | 3/2002 |
| WO | 03/069495 | 8/2003 |
| WO | 2004/038541 A2 | 5/2004 |
| WO | W02004063843 | 7/2004 |
| WO | W02005088466 | 9/2005 |
| WO | 2007041417 | 4/2007 |

OTHER PUBLICATIONS

Jim Dowling et al.—"Improving ICE Service Selection in a P2P System using the Gradient Topology"—First International Conference on Self-Adaptive and Self-Organizing Systems (SASO 07), 2007, IEEE, pp. 285-288.

European Search Report dated Jan. 28, 2010 issued for European patent application No. 99252219.2.

J. Rosenberg, Simple Traversal of UDP Through Network Address Translators (NAT), BEHAVE Inernet-Draft, Jul. 17, 2005.

J. Rosenberg, Interactive Connectivity Establishment (ICE): A methodology for Network Address Translator (NAT) Traversal for Offer/Answer Protocols, MMusic Internet-Draft, Jul. 17, 2005.

F. Audet, NAT Behavioral Requirements for Unicast UDP, BEHAVE Internet-Draft, Jul. 15, 2005.

J. Rosenberg, Interactive Connectivity Establishment (ICE): A Methodology for Network Address Translator (NAT) Traversal for Multimedia Session Establishment Protocols, MMusic Internet-Draft, Oct. 25, 2004.

J. Rosenberg, Traversal Using Relay NAT (TURN), MIDCOM Internet-Draft, Oct. 20, 2003.

Y. Takeda, Symmetric NAT Traversal Using STUN, Internet Engineering Task Force, Jun. 2003.

J. Rosenberg, Interactive Connectivity Establishment (ICE): A Methodology for Network Address Translator (NAT) Traversal for Offer/Answer Protocols, MMusic Internet-Draft, Jan. 16, 2007.

J. Rosenberg, Interactive Connectivity Establishment (ICE): A Methodology for Network Address Translator (NAT) Traversal for Multimedia Session Establishment Protocols, MMusic Internet-Draft, Jul. 19, 2004.

J Rosenberg, STUN—Simple Traversal of User Datagram Protocols (UDP) Through Network Address Translator (NATs), Network Working Group, Mar. 2003.

Office Action dated Mar. 24, 2010 issued for U.S. Appl. No. 12/235,409.

Final Office Action dated Apr. 12, 2010 issued for U.S. Appl. No. 11/243,853.

U.S. Appl. No. 60/992,295, filed Dec. 4, 2007.

U.S. Appl. No. 60/992,282, filed Dec. 4, 2007.

"DCNET Internet Clock Service", IETF RFC 778, Apr. 18, 1981, David L. Mills.

"DCN Local-Network Protocols", IETF RFC 891, Dec. 1983, David L. Mills.

"Algorithms for Synchronizing Network Clocks", IETF RFC 956, Sep. 1985, David L. Mills.

"Network Time Protocol (NTP)", IETF RFC 958, Sep. 1985, David L. Mills.

"Network Time Protocol (Version 3)", IETF RFC 1305, Mar. 1992, David L. Mills.

"Simple Network Time Protocol (SNTP) Version 4", IETF RFC 2030, Oct. 1996, David L. Mills.

"User Datagram Protocol" in IETF RFC 768, Aug. 28, 1980, J. Postel.

"Cell Broadband Engine Architecture", Aug. 8, 2005, IBMC, SCEI, Toshiba Corporation.

Invitation to Pay Additional Fees and, Where Applicable, Protest Fee dated Apr. 7, 2009 for International Patent Application No. PCT/US2008/083002.

Final Office Action dated Jul. 19, 2010 issued for U.S. Appl. No. 12/235,409.

Office Action dated Aug. 31, 2010 issued for U.S. Appl. No. 111/243,853.

Final Office Action dated Aug. 31, 2010 issued for U.S. Appl. No. 12/235,438.

Notice of Allowance and Fees Due dated Jul. 22, 2010 issued for U.S. Appl. No. 12/043,080.

PCT International Search Report and Written Opinion of the Internal Searching Authority dated Sep. 28, 2009 for international application No. PCT/US2009/034913.

PCT International Search Report and Written Opinion of the Internal Searching Authority dated Jan. 24, 2007 for international application No. PCT/US2006/38285.

The International Search Report of the Written Opinion of the International Searching Authority dated Nov. 6, 2009 for the international application No. PCT/US2009/057192.

Steven Hessing: "Peer to Peer Messaging Protocol (PPMP)" Internet Draft, Apr. 2002, pp. 1-57, XP015001173.

Song Jiang et al.: "FloodTrial: an efficient file search technique in unstructured peeito-peer systems" GLOBECOM 2003, vol. 5, Dec. 1, 2003, pp. 2891-2895, XP010678188.

Dutkiewicz E Ed—Institute of Electrical and Electronics Engineers: "Impact of transmit range on throughput performance in mobile ad hoc networks" ICC 2001. 2001 IEEE International Conference on Communicanons: Conference Record. Helsinky, Finland. Jun. 11-14, 2001, IEEE International Conference on Communications, New York, NY IEEE, US vol. vol. 1 of 10, Jun. 11, 2001, pp. 2933-2937, XP010553662 ISBN: 0-7803-7097-1.

Kim Y Ed—Association for Computing Machinery: "Simple and Fault—Tolerant Key Agreement by Dynamic Collaborative Groups", Proceedings of the 7m ACM Conference on Computer and Communications Security. CS 2000, Athens, Greece, Nov. 1-4, 2000. ACM Conference on Computer and Communications Security, New Your, NY: ACM, US, vol. Conf. 7, Nov. 1, 2000, pp. 1 38, XP 002951317 ISBN: 1-58113-203 4.

Baughman et al., Cheat-proof play out for centralized and distributed online games, INFOCOM2001. Twentieth Annual Joint Conference of the IEEE Computer and Communications Societies. Proceedings. IEEE Publication Date: 2226 Apr. 2001, On pp. 104-113, vol. 1.

Office Action dated Jun. 4, 2009 issued for U.S. Appl. No. 10/215,899.

Office Action dated Nov. 7, 2008 issued for U.S. Appl. No. 10/215,899.

Office Action dated Mar. 13, 2008 issued for U.S. Appl. No. 10/215,899.

Office Action dated Sep. 11, 2007 issued for U.S. Appl. No. 10/215,899.

Office Action dated Mar. 22, 2007 issued for U.S. Appl. No. 10/215,899.

Office Action dated Aug. 12, 2005 issued for U.S. Appl. No. 10/215,899.

NAT and Network Games, p. 1-5, entitled: Just the FAOs, Ma'am, http://www.u.arizona.edu/~trw/games/nat.htm, Oct. 23, 2002.

BroadbandReports.com, How to hookup our console to the net—section all, pp. 1 to 22, http://www.dslreports.com/fag/onlinegaming/all.

Do I use NAT?, pp. 1 to 3, http://www.u.arizona.edu/~trw/games/nat or not.php, Oct. 23, 2002.

Home Toys Article, HAI Omni Solution, UPnP NAT Traversal FAQ, pp. 1 to 4 http://hometoys.com/htinews/aug01/articles/microsoft/upnp.htm, Nov. 11, 2002.

InternetGatewayDevice: I Device Template Version 1.01, Copyright 1999-2001 Microsoft Corporation, 16 pgs.

STUN—Simple Traversal of UDP Thrugh NATs, J. Rosenberg et al. pp. 1-29, Copyright The Internet Society.

Traversal Using Relay NAT (TURN), Rosenberg, Weinberger, Huitema, Mahy, Nov. 14, 2001, pp. 1 to 17.

http://www2.simplex.com/ip.shtml.

http://www.dslreports.com/ip.

Network Address Translators. Microsoft Corporation Jan. 2001, http://msdn.microsoft.com/library/default.asp?irl=/library/en-us/dnplay/html/nats2-msdn.asp.

Nat and Peer-to-Peer networking, Dan Kegel. Copyright 1999 http://alumnus.caltech.edu/-dank/peer-nat.html.

Office Action dated May 5, 2009 issued for U.S. Appl. No. 11/708,988.

Final Office Action dated Oct. 29, 2009 issued for U.S. Appl. No. 11/708,988.

Office Action dated Feb. 22, 2010 issued for U.S. Appl. No. 11/708,988.

Notice of Allowance and Fee(s) Due dated Oct. 28, 2009 for U.S. Appl. No. 10/215,899.

Office Action issued by the European Patent Office (EPO) on Feb. 17, 2010 for European patent application No. 09022219.2.

Office Action issued by the USPTO on Apr. 15, 2010 for U.S. Appl. No. 12/235,438.

* cited by examiner

NETWORK BANDWIDTH DETECTION AND DISTRIBUTION

CLAIM OF PRIORITY

This application claims the priority benefit of commonly-assigned, co-pending U.S. Provisional Patent application No. 60/992,295 to James E. Marr, Yutaka Takeda, Attila Vass, Payton White and Stephen C. Detwiler entitled "NETWORK TRAFFIC PRIORITIZATION", filed Dec. 4, 2007, the entire disclosures of which are incorporated herein by reference.

This application claims the priority benefit of commonly-assigned, co-pending U.S. Provisional Patent application No. 60/992,282 to Yutaka Takeda, James E. Marr, Stephen C. Detwiler, Attila Vass, and Payton White entitled "NETWORK BANDWIDTH DETECTION AND DISTRIBUTION", filed Dec. 4, 2007, the entire disclosures of which are incorporated herein by reference.

CROSS-REFERENCE TO RELATED APPLICATION

This application is related to commonly-assigned, U.S. patent application Ser. No. 12/267,233 to James E. Man, Yutaka Takeda, Attila Vass, Payton White and Stephen C. Detwiler entitled "NETWORK TRAFFIC PRIORITIZATION", now U.S. Pat. No. 7,856,501, filed the same day as the present application, the entire disclosures of which are incorporated herein by reference.

This application is related to commonly-assigned, U.S. patent application Ser. No. 12/267,269 to James E. Man, Yutaka Takeda, Attila Vass, Payton White and Stephen C. Detwiler entitled "NETWORK BANDWIDTH DETECTION, DISTRIBUTION AND TRAFFIC PRIORITIZATION", now U.S. Pat. No. 7,908,393, filed the same day as the present application, the entire disclosures of which are incorporated herein by reference.

FIELD OF THE INVENTION

The present invention relates to computer network communication, and more specifically to detecting available bandwidth for network traffic and distributing the available bandwidth among distinct channels of communication within a single application.

BACKGROUND OF THE INVENTION

Computing systems are becoming increasingly interconnected through network environments. Such network environments may be centralized or decentralized. A decentralized computing environment may be defined by a number of computing systems interconnected to communicate with one another, wherein each computing system can perform both client and server functions. A peer-to-peer (P2P) network represents an example of a decentralized computing environment in which each computing system within the P2P network is defined as a peer of every other computing system within the network. For discussion purposes, each peer computing system within the P2P network is referred to as a node. Additionally, each node within the P2P network may be configured to execute software having substantially equivalent functionality. Therefore, each node may act as both a provider and a user of data and services across the P2P network. Peer to peer networks are distributed data networks without any centralized hierarchy or organization. Peer to peer data networks provide a robust and flexible means of communicating information between large numbers of computers or other information devices, referred to in general as nodes.

A P2P network relies primarily on the computing power and bandwidth of the participants in the network rather than concentrating it in a relatively low number of servers. P2P networks are typically used for connecting nodes via largely ad hoc connections. Such networks are useful for many purposes. P2P networks may be used, e.g., for sharing content files containing audio, video, data or anything in digital format is very common, and real-time data, such as telephony traffic, may also be transmitted using P2P technology.

P2P applications often involve a significant amount of communication between nodes over different communication channels. By way of example, such channels may include an audio channel, a video channel, and a file transfer channel. A given application, e.g., audio-video (A/V) chat may communicate using all three channels. Typically, an application has a limited amount of network bandwidth available for communication. The application distributes the available bandwidth among the communication channels. However, the amount of available network bandwidth is generally not known.

Prior art network implementations involving multiple communication channels typically adopt an "all or nothing" approach that can lead to bandwidth starvation. For example, consider a very low bandwidth situation where a user is attempting to engage in A/V chat involving transmission of captured audio and video frames. If the user does not have enough bandwidth available to transmit all of the captured audio and video frames, prior art techniques typically give complete priority to the audio frames and do not transmit any video frames. This may reduce quality of service for the A/V chat.

It is within this context that embodiments of the present invention arise.

BRIEF DESCRIPTION OF THE DRAWINGS

The teachings of the present invention can be readily understood by considering the following detailed description in conjunction with the accompanying drawings, in which.

DESCRIPTION OF THE SPECIFIC EMBODIMENTS

Although the following detailed description contains many specific details for the purposes of illustration, anyone of ordinary skill in the art will appreciate that many variations and alterations to the following details are within the scope of the invention. Accordingly, the exemplary embodiments of the invention described below are set forth without any loss of generality to, and without imposing limitations upon, the claimed invention.

TECHNICAL BACKGROUND

Figure 1:
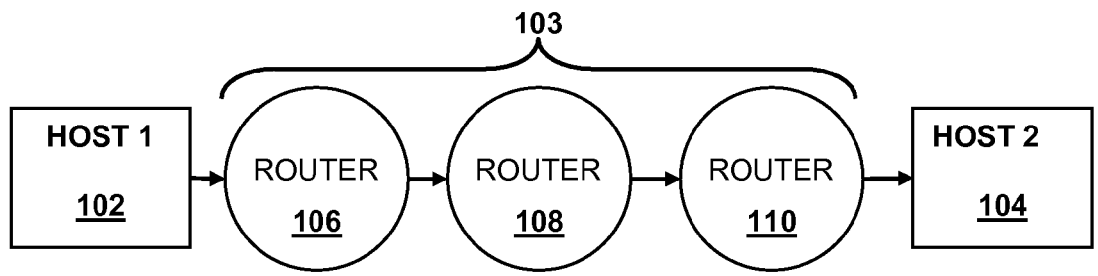
FIG. 1 is a block diagram illustrating a network path between two hosts.

Embodiments of the present invention may be understood in the context of network communications. FIG. 1 illustrates an example of network communication between Host 1 102 and Host 2 104. By way of example, the hosts may be any network capable device. Such devices include, but are not limited to computers, hand held internet browsers and/or email devices, Voice over Internet Protocol (VoIP) phones, video game consoles, hand held video game devices, and the like. Messages from Host 1 travel to Host 2 over a network path 103 via routers 106, 108, and 110. Each router may have a different Maximum Transmission Unit (MTU). In this example, router 106 has an MTU of 1500 bytes, router 108 has an MTU of 1000 bytes and router 110 has an MTU of 1500 bytes. The path MTU for the path 103 is the smallest MTU of any router in the path, which is 1000 bytes in this example.

Figure 2:
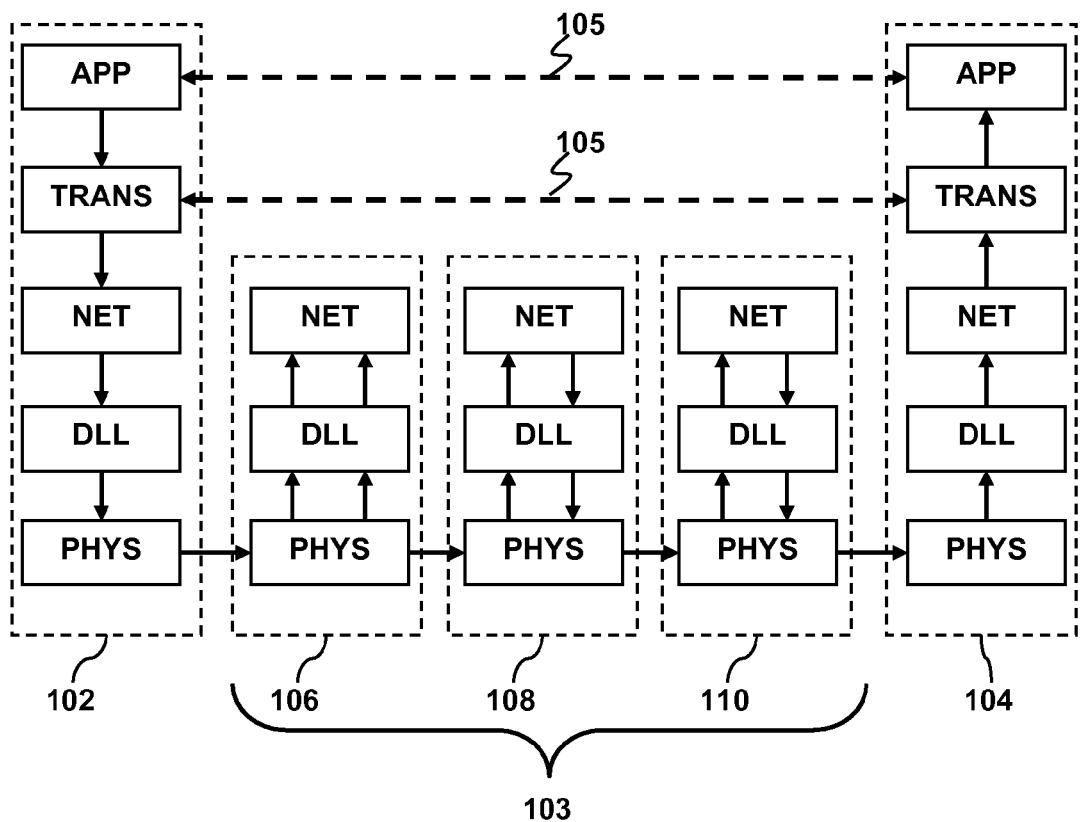
FIG. 2 is a block diagram illustrating the protocol stacks in the hosts and routers of FIG. 1.

The Hosts 102, 104 and routers 106, 108, 110 may be configured to communicate with each other according to a network protocol. FIG. 2 illustrates an example of a network protocol configuration for the situation shown in FIG. 1. By way of example, each host device 102, 104 may be configured (either in software or hardware or some combination of both) with a network protocol stack having five layers: an Application layer APP, a Transport layer TRANS, a Network layer NET (sometimes referred to as the IP layer), a Data Link Layer DLL and a Physical layer PHYS. These layers are well-known to those of skill in the art. The Hosts 102, 104 typically implement all five layers. The routers 106, 108, 110 typically implement only the Network, Data Link and Physical layers.

By way of example, embodiments of the present invention may implement Path MTU discovery at the Application layer. Typically, the Transport layer and below are implemented in an operating system (OS) kernel and applications have no control in changing behavior at these layers. Classic PMTUD, by contrast, is typically implemented at the Transport and IP (Network) layers.

The Application layer APP represents the level at which applications access network services. This layer represents the services that directly support applications such as software for file transfers, database access, and electronic mail. Examples of application layer software include HL7, Modbus, Session Initiation Protocol (SIP), and Simple Sensor Interface Protocol (SSI). In the particular case of the TCP/IP suite, the Application layer APP may be implemented with software protocols such as Hypertext Transfer Protocol (HTTP), Session Initiation Protocol (SIP), Simple Mail Transfer Protocol (SMTP), Short Message Peer-to-Peer Protocol (SMPP), Simple Network Management Protocol (SNMP), File Transfer Protocol (FTP), Teletype Network (TELNET), Network File System (NFS), Network Time Protocol (NTP), Real-time Transport Protocol (RTP), Dynamic Host Configuration Protocol (DHCP), and Domain Name System (DNS). The Application layer APP may sometimes be divided further into a Presentation layer and a Session layer, e.g., in the Open Systems Interface (OSI) protocol. The Presentation layer translates data from the Application layer into an intermediary format. The Presentation layer may also manages security issues by providing services such as data encryption, and compresses data so that fewer bits need to be transferred on the network. The Session layer allows two applications on different computers to establish, use, and end a session. As used herein, a session (also sometimes called a "user session") refers to a particular instance of user interface with an application. By way of example, a session typically begins when the user accesses the application and typically ends when the user quits the application. The Session layer may establish dialog control between the two computers in a session, regulating which side transmits, plus when and how long it transmits.

The Transport layer TRANS handles error recognition and recovery. For a transmitting host, the Transport layer may also repackage long messages when necessary into small packets for transmission. For a receiving host the Transport layer rebuilds packets into the original message. The Transport layer for a receiving host may also send receipt acknowledgments. Examples of particular Transport layer protocols include Transmission Control Protocol (TCP), User Datagram Protocol (UDP) and Stream Control Transmission Protocol (SCTP), all of which, and equivalents thereof, are well-known to those of skill in the art. The Transport layer TRANS is the layer that typically supports packet fragmentation. It is noted that fragmentation may take place in the Transport layer of the host originating a message or at the Transport layer of any of the routers along the path between that host and the message's intended recipient.

The Network layer NET addresses messages and translates logical addresses and names into physical addresses. It also determines the route from the source to the destination computer. The Network layer may also manages traffic problems, such as switching, routing, and controlling the congestion of data packets. Examples of particular Network layer protocols include, but are not limited to, Internet Protocol (IP), Internet Control Message Protocol (ICMP), IP Security (Ipsec), Address Resolution Protocol (ARP), Routing Information Protocol (RIP) and Open Shortest Path First (OSPF) all of which, and equivalents thereof, are well-known to those of skill in the art The Data Link layer DLL packages raw bits from the Physical layer PHYS into frames (logical, structured packets for data). The Data Link layer may also be responsible for transferring frames from one computer to another, without errors. After sending a frame, the Data Link layer DLL waits for an acknowledgment from the receiving computer. Examples of particular Data Link layer protocols include, but are not limited to, Point-to-Point Protocol (PPP), Serial Line Internet Protocol (SLIP) and Media Access Control (MAC)

all of which, and equivalents thereof, are well-known to those of skill in the art. The Data Link layer DLL typically limits the MTU size.

The Physical layer PHYS transmits bits from one computer to another and regulates the transmission of a stream of bits over a physical medium. This layer defines how the cable is attached to the network adapter and what transmission technique is used to send data over the cable. Examples of particular Physical layer protocols and standards include, but are not limited to, RS-232, V.35, V.34, I.430, I.431, T1, E1, 10BASE-T, 100BASE-TX, POTS, SONET, DSL, 802.11a, 802.11b, 802.11g, 802.11n all of which, and equivalents thereof, are well-known to those of skill in the art A message originating at Host 1 102 starts at the Application layer APP and works its way down the protocol stack to the Physical layer PHYS. When the message arrives as Host 2 104, it is received at the Physical layer PHYS and works its way up the stack to the Application layer APP. In the path 103 between the two hosts 102, 104, the message is received at the Physical layer PHYS of router 106 and works its way up to the Transport layer TRANS and then back down the stack to the Physical layer PHYS for transmission to router 108. The process repeats for routers 108 and 110. In peer-to-peer situations, once a connection has been established between the hosts 102, 104 they may communicate by peer-to-peer connections 105. The peer-to-peer connections 105 are not short cut routes for messages. Instead, a peer-to-peer connection merely indicates that each layer's message, or signal, that is embedded in a message as a header is understood or handled by the counterpart of the same layer entity. The messages between hosts 102 and 104 follow the same path through the routers 106, 108 and 110 regardless of whether it is peer-to-peer or client-server situation.

Embodiments of the present invention are directed to solving the problem of determining the available bandwidth for communication between two nodes over a network. Embodiments of the invention solve this problem by implementing an initial bandwidth estimation and a dynamic transmission rate adjustment corresponding to actual available bandwidth that changes over time. Additionally, embodiments of the invention may implement a way to optimize transmission rate when a node is communicating with more than one remote node, by making use of collective knowledge of bandwidth characteristics of each of the remote nodes. Embodiments of the invention may be applied to various network-related applications including real-time online gaming, multiparty call conference and audio visual (AV) chat applications.

According to an embodiment of the invention a bandwidth sensing module may include an Initial bandwidth measurement stage and a dynamic bandwidth adjustment stage. This fundamental measurement scheme may be further extended to global bandwidth management for applications that communicate with many remote nodes. (e.g. Multi-party AV chat.) The initial bandwidth measurement stage may implement maximum transmission unit (MTU) size discovery, e.g., as described in commonly-assigned U.S. patent application Ser. No. 11/755,693 to Yutaka Takeda, James Marr, and Payton White entitled "NETWORK COMMUNICATION WITH PATH MTU SIZE DISCOVERY", the entire contents of which are incorporated herein by reference. It is noted that initial bandwidth estimation is rather difficult problem. Many existing applications that require knowledge of available network bandwidth assume there is a static amount of bandwidth. Alternatively, an application may ask a user in advance what type of network connection (Dialup, ISDN, Cable-modem, T1/LAN, etc) is being used rather than detecting it dynamically. Embodiments of the present invention may implement completely automatic bandwidth measurement in conjunction with MTU size discovery along with global bandwidth management.

Embodiments of the present invention address a number of different issues associated with network bandwidth management. Specifically, it is useful for a node to be able to make an initial determination of available bandwidth. In addition, it is desirable to be able to adjust a sending rate from the node in response to changes in the available bandwidth. Furthermore, in some embodiments, two or more different applications running on a given node may be communicating over a network. In such a case, it may be useful to determine a policy for bandwidth distribution among the different applications and to manage the bandwidth distribution while the applications are running.

Figure 3:
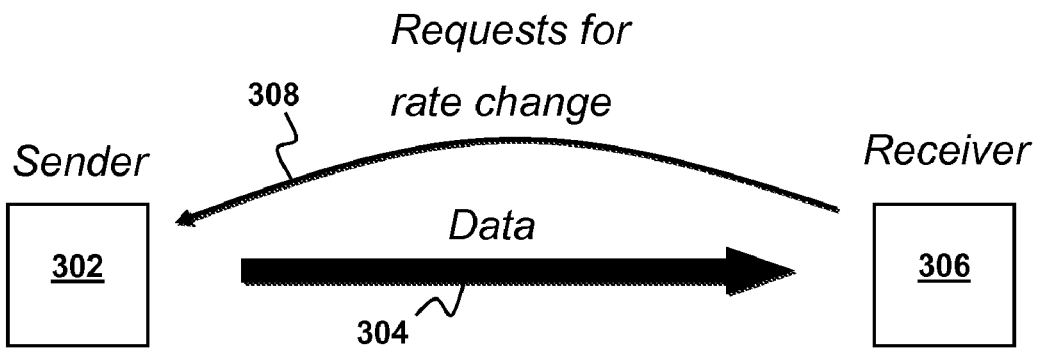
FIG. 3 is a schematic diagram of nodes connected via a network illustrating a "dumb sender" model for bandwidth measurement according to an embodiment of the present invention.

Bandwidth Measurement FIG. 3 illustrates an example of bandwidth measurement using a "Dumb Sender" model. According to this model a first node 302 sends traffic 304, e.g., one or more data packets, to a second remote node 306. The second node 306 detects a traffic status from analysis of the traffic 304 received from the first node 302. By way of example, each packet of the traffic 304 may include a timestamp and a sequence number along with application data so that the second node 306 can detect packet loss and propagation delay over the network. Based on the traffic status, the second node 306 may request that the sender send traffic at a specific rate based on the status. By way of example, the second node 306 may request the specific rate by sending a message packet 308 containing the specific rate to the first node 302. Once the first node 302 receives the specific rate from the second node 306, the first node 302 simply follows the request and transmits data at the requested rate.

The dumb sender model may be used to implement both the initial bandwidth measurement and the dynamic bandwidth measurement that are described below. In a "Dumb Sender" model of the type illustrated in FIG. 3, a receiver (e.g., the second node 306) knows in what state of measurement it is and is in full control of the sending rate of a sender (e.g., the first node 302), while the sender just follows instructions from the receiver.

Initial Bandwidth Measurement

Figure 4:
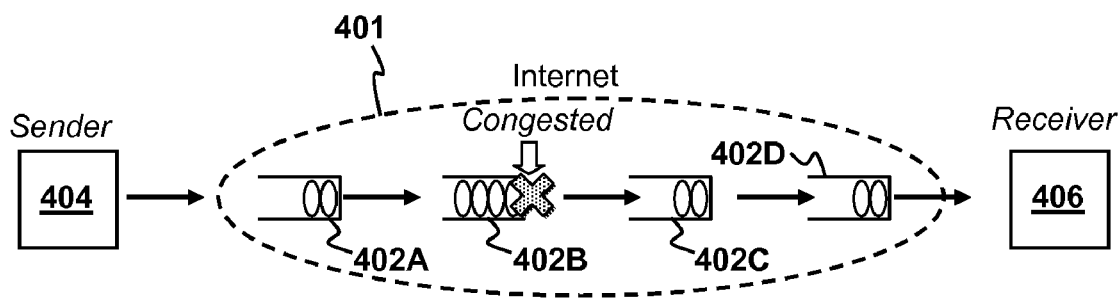
FIG. 4 is a schematic diagram of nodes connected via a network illustrating the issue of "flooding" in bandwidth determination according to embodiments of the present invention.

FIG. 4 illustrates the issue with "flooding". As seen in FIG. 4, a path 401 over a network may be regarded as a series of queues 402A, 402B, 402C, 402D. Each queue represents an accumulation of data packets at routers or switches on the path between a first node 404 and a second node 406. Packet loss may not occur on the path until one or more of the queues (e.g., the third queue 402C) becomes full. Flooding occurs when one or more of the queues receives more packets than they can handle. Such flooding may cause a large latency that may take long time to recover. It is therefore desirable for embodiments of the invention to take such latency growth into consideration when making an initial bandwidth measurement.

Figure 5:
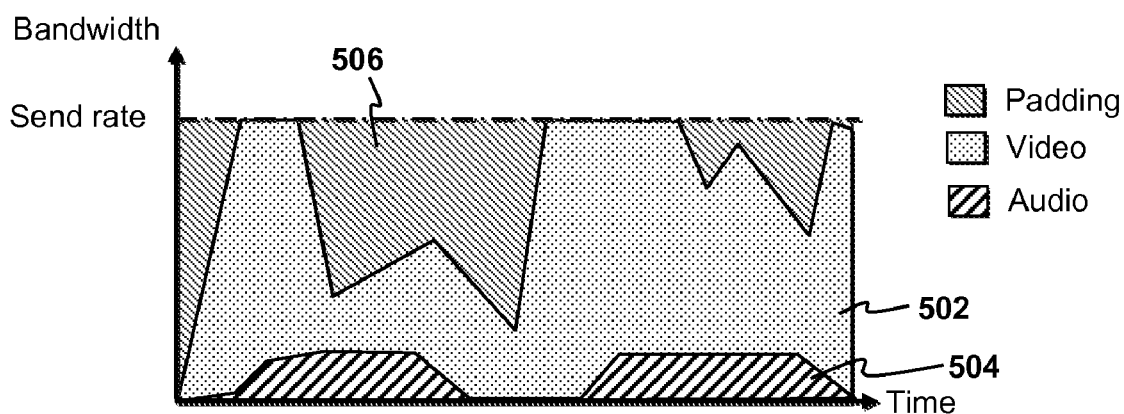
FIG. 5 is a graph of data transmission as a function of time illustrating bandwidth padding in conjunction with embodiments of the present invention.

The graph depicted in FIG. 5 illustrates the importance of "padding" bandwidth in embodiments of the present invention. Most media is of Variable Bit Rate (VBR). This means that the bit rate may vary over time due to the nature of the data being sent. For example, in MPEG Video data 502, the bit rate depends partly on the amount of movement taking place in a video frame. A greater amount of movement leads to a higher bit rate. In transmission of audio data 504, silence suppression may generate fewer packets or no packets at all during periods of silence. In order to accurately measure bandwidth, it is desirable to pad the data being sent with extra packets 506 so that a constant amount of data is transmitted per unit time during bandwidth measurement. The inventors have observed that without padding, the receiver starts allocating more bandwidth than the network can actually handle, and then when the video and audio data use up the full available bandwidth, growth of delay or packet loss (degradation of quality) occurs.

According to embodiments of the present invention, an initial bandwidth for a network path between two nodes may be determined as follows. First propose MTU discovery may be performed to determine the MTU for the network path. An example of path MTU discovery is described, e.g., as described in application Ser. No. 11/755,693. Once the network path MTU has been determined, data packets may be sent from the first node to the second node starting at some initial bandwidth value. The sending rate may then be gradually increased from the initial value by a fixed percentage at regular intervals of time until propagation delay is detected. The value of the sending rate when propagation delay is detected may then be used as the initial bandwidth value.

This so-called slow-start approach may begin with a sending rate set at some suitably low bandwidth value, e.g., 16 Kbps, 64 KKbps or 128 Kbps. The time needed for the sending rate to increase to a given bandwidth value depends partly on the initial and given bandwidth values, the interval between increases in the sending rate, and the percentage increase in sending rate for each interval. For example, Table I below shows a case where the given value is 280 Kbps, the sending rate is increased every second and various initial bandwidth values and percentage increases are assumed.

TABLE I

| | Initial B/W | | |
|---|---|---|---|
| Increase rate | 16 Kbps | 64 Kbps | 128 Kbps |
| +10% | 30 sec | 17 sec | 9 sec |
| +20% | 17 sec | 10 sec | 6 sec |
| +25% | 14 sec | 8 sec | 5 sec |
| +30% | 12 sec | 7 sec | 4 sec |

Given the foregoing discussion, the initial bandwidth measurement preferably satisfies certain requirements. Specifically, in the initial bandwidth measurement it is useful to detect growth of a propagation delay. If the propagation delay grows as the sending rate is increased, it may be deduced that a bandwidth saturation point has been exceeded. By way of example, propagation delay may be determined by a measurement of the amount of time a packet spends in transit over the network. By way of example, the sender may add a timestamp at the time of transmission to each packet so that the receiver can tell how much time the packet spent over the network by comparing the time of receipt of the packet and the timestamp field in the packet. To implement this, it is desirable for the sender's and receiver's "clocks" to be accurately synchronized. The clock synchronization may be done by a time synchronization protocol, such as Network Time Protocol (NTP). To implement such time synchronization, each client is synchronized with a NTP server. The operational details of NTP are described by David L. Mills in *RFC 778*, *RFC 891*, *RFC 956*, *RFC 958*, and *RFC 1305*, which may be accessed on the Internet at http://tools.ietf.org/html/rfc778, http://tools.ietf.org/html/rfc891, http://tools.ietf.org/html/rfc956, http://tools.ietf.org/html/rfc958 and http://tools.ietf.org/html/rfc1305 respectively and which are all incorporated herein by reference.

In some situations the accuracy of time determined by NTP may not be good enough to detect propagation delays of order 10 milliseconds. In such situations a peer-to-peer direct time synchronization may be implemented using a protocol similar to that of NTP, known as Simple Network Time Protocol (SNTP), which is described by David L. Mills in RFC 2030, which may be accessed on the Internet at http://tools.ietf.org.html/rfc2030, which is incorporated herein by reference. A local peer and a remote peer may perform a peer-to-peer time sync with each other using timestamps similar to those used in SNTP to calculate relative time differences. A timestamp generated by the remote peer may be converted to the local time with the calculated relative timestamp. By way of example a propagation delay may be determined from four timestamps $t_1, t_2, t_3, t_4$ where $t_1$ is the time the local node sent a message packet, $t_2$ is the time the remote node received the message packet, $t_3$ is the time the remote node sent a response to the message packet and $t_4$ is the time the local node received the response. The propagation delay $t_{PD}$ may be calculated as $$t_{PD}=((t_4-t_1)-(t_3-t_2))/2$$

Once the propagation delay is known, a time difference $t_{DIFF}$ may be calculated as $$t_{DIFF}=t_3+t_{PD}-t_4.$$

Once $t_{DIFF}$ is determined, the local node can calculate propagation delay $t_{PD}$ of subsequent each packet sent from the remote node using $t_{DIFF}$, a timestamp $t_S$ received from a remote peer and a locally generated time of receipt $t_R$. Specifically:

$$t_{PD}=t_R-(t_S+t_{DIFF}).$$

In addition, it is desirable that the initial bandwidth measurement avoid introducing an excessive amount of traffic to the network. Therefore a slow-start is desirable. It is also desirable to retry measurements at larger transmission unit (TU) sizes (e.g., 150% of the current TU size) at least a few times, e.g., up to two times, in order to improve the correctness of the measurement. What I meant by "larger" here is "the next TU size" 150% of the current TU size. Furthermore it is desirable that path MTU detection take place as quickly as possible, e.g., within about 30 seconds. It is generally not desirable to try too many times as the initial bandwidth measurement is desired to be completed in a short time (e.g., 30 sec as suggested here).

Path MTU Discovery

By way of example, discovery of the path MTU size may be implemented as explained below with respect to FIGS. 6A-6C. Path MTU discovery may be based on two observations. The first observation is that most routers will properly fragment packets that conform to certain Transport Layer protocols. An example of such a protocol is the User Datagram Protocol (UDP). UDP is a minimal message-oriented transport layer protocol that is described, e.g., by J. Postel in IETF RFC 768, Aug. 28, 1980, which may be accessed on the Internet at http://tools.ietf.org/html/rfc768, the contents of which are incorporated herein by reference. In the Internet protocol (IP) suite, UDP may provide a very simple interface between a network layer below (e.g., IPv4) and a session layer or application layer above. UDP is often described as being a connectionless protocol. As used herein connectionless, refers to network protocols in which a host can send a message without establishing a connection with the recipient. That is, the host simply puts the message onto the network with the destination address and hopes that it arrives. Other examples of connectionless protocols include Ethernet and IPX. UDP is typically used for message broadcast (sending a message to all on a local network) or multicast (sending a message to all subscribers). Common network applications that use UDP include the Domain Name System (DNS), streaming media applications such as Internet Protocol Television (IPTV), Voice over IP (VoIP), Trivial File Transfer Protocol (TFTP) and online games.

The second observation is that routers tend to exhibit one or two particular types of bandwidth limitation behavior. Specifically, router bandwidth limitation may be classified as being either packet rate limited or bit rate limited. In a packet rate limited router, the data transmission rate is determined by a number of packets the router can transmit per unit time. For a packet rate limited router, the size of the packets does not affect the number of packets the router can send per unit time as long as the packets are no larger than some maximum packet size, which determines the MTU for that router. Packet rate limited routers are sometimes referred to herein as being packet-per-second (pps) limited. For a pps-limited router, it makes sense to send packets that are as large as possible in order to optimize the data transmission rate. For a bit rate limited router, by contrast, the data transmission rate is determined by a maximum number of bits per unit time that is independent of the packet size. Bit-rate limited routers are sometimes referred to herein as being bit-per-second (bps) limited. It is noted that both bps-limited routers and pps-limited routers may fragment a packet depending on the MTU set to the router.

Rate limitation, which may occur either intentionally or unintentionally, could happen at any layer in the protocol stack. One "intentional" case that is very common is to set up IP tables (set policies within the IP and transport layers) to throttle bandwidth. Bandwidth saturation may be detected at the receiver side by observing packet loss and increase of latency. As described above, there are a series of queues in the path. When saturation occurs somewhere in the path, a queue right before the saturation point starts accumulating packets. This may be observed as an "increase of latency" at the receiver by checking timestamps added to each packet. Eventually, the queue becomes full and packets start being dropped, which may also be observed at the receiver side by checking sequence numbers attached to each packet.

Figure 6A:
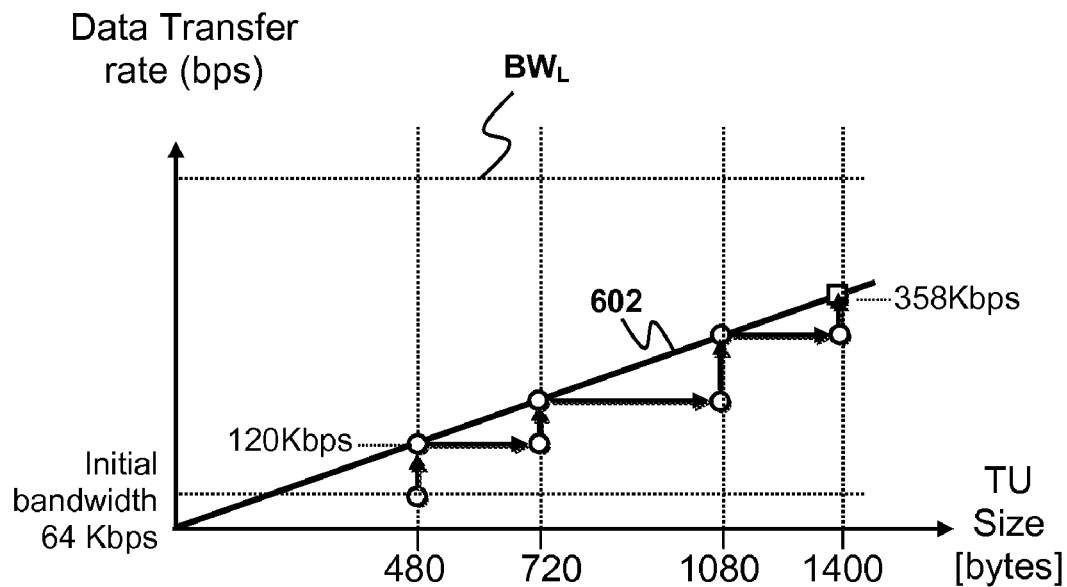
FIG. 6A is a graph illustrating the data transmission rate of a packet rate limited router as a function of packet size.
Figure 6B:
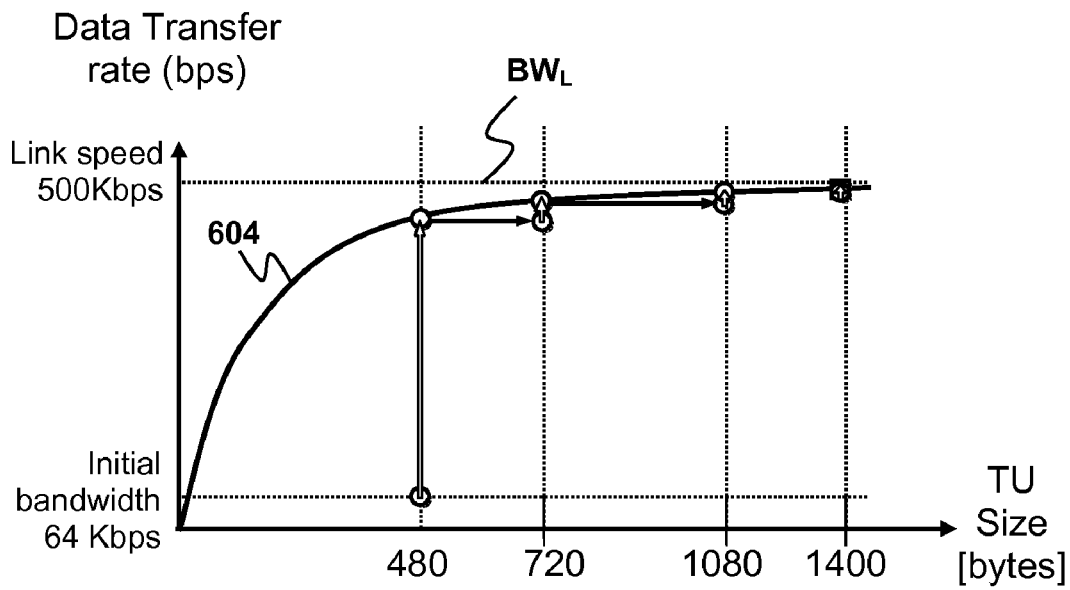
FIG. 6B is a graph illustrating the data transmission rate of a bit rate limited router as a function of packet size.

The difference in behavior of the packet rate limited and bit rate limited routers is illustrated in FIGS. 6A-6B. Specifically, FIG. 6A graphically depicts the data transfer rate for UDP packets as a function of transmission unit size TU for a packet rate limited router. In each case, the network path has a bandwidth limit of 500 Kilobits per second (Kbps). Packets at an initial size are sent at an initial bandwidth $BW_0$ (e.g., 64 Kbps). Preferably the sending host has the ability to "throttle" the bandwidth with which the packets are sent. The sending bandwidth may be gradually increased above the initial bandwidth $BW_0$, e.g., by a fixed percentage each second until bandwidth saturation is detected. Such a "slow-start" approach is often useful since packets are queued at each node. A long queue increases latency, which is undesirable. Long queues also tend to take a long time to be recovered. Embodiments of the present invention avoid this by gradually increasing the sending bandwidth BW while keeping the TU size fixed. Each packet includes a request for the receiving host to provide the data transfer rate (e.g., in bits per second (bps) for the received packets. As the bandwidth is increased, the data transfer rate for the received packets will continue to increase until the bandwidth reaches a point of saturation. At this point, increasing the bandwidth does not further increase the data transfer rate for the packets. Once saturation has been detected, the transmission unit size TU may then be increased, e.g., by some fixed percentage such as 50%, and the process may be repeated starting at an initial bandwidth approximately equal to the saturation bandwidth for the previous transmission unit size TU.

By observing the behavior of the bandwidth saturation as a function of TU size, the behavior of the network path between two nodes may be determined. For packets that are smaller than the router's MTU, the packet-limit saturated data transfer rate increases approximately linearly as the packet size increases as indicated by the lower dotted line 602 in FIG. 6A. For example, if the path contains a router having a packet limit of 32 packets per second and an initial packet size of, e.g., 480 8-bit bytes, the data transfer rate for the packets will saturate at about 120 Kbps. If the packet size is increased by 50%, e.g., to 720 bytes, but remains below the MTU size for the router, the bandwidth will saturate at about 180 Kbps. Such linear behavior is characteristic of a pps-limited router. Packets that are greater than the MTU size for the router are fragmented into two or more packets. As a result, the number of packets increases but the packet transmission rate does not. Consequently, the data transmission rate abruptly drops just beyond the MTU size. If the packet size is again increased, the data transmission rate for a pps-limited router is expected to increase in an approximately linear fashion until the packet size reaches another integer multiple of the MTU size. It is noted that even if the network path is packet-rate limited there is an upper limit on bandwidth saturation (e.g., 500 kbps) as indicated by the upper dotted line $BW_L$.

FIG. 6B graphically depicts the data transfer rate for UDP packets as a function of packet size for a bit rate limited router. It is noted that a bit rate limited router is generally not sensitive to fragmentation of the packets because it is not affected by the number of packets sent per second. For example, sending 1000 bytes/sec or 500 byte packets at 2 packets/sec is the same for a bit rate limited router. However, although the bandwidth may be more or less fixed for such a router, the data transfer rate (e.g., in bits per second) may vary due to a more or less constant latency associated with transmission of each packet. As a result of the latency, the data transfer rate for a bps-limited router will initially tend to increase sharply with packet size and indicated by the curve 604. However, as the data transmission rate approaches the bandwidth limit $BW_L$ for the network path, the transmission rate will tend to flatten off as a function of packet size.

Figure 6C:
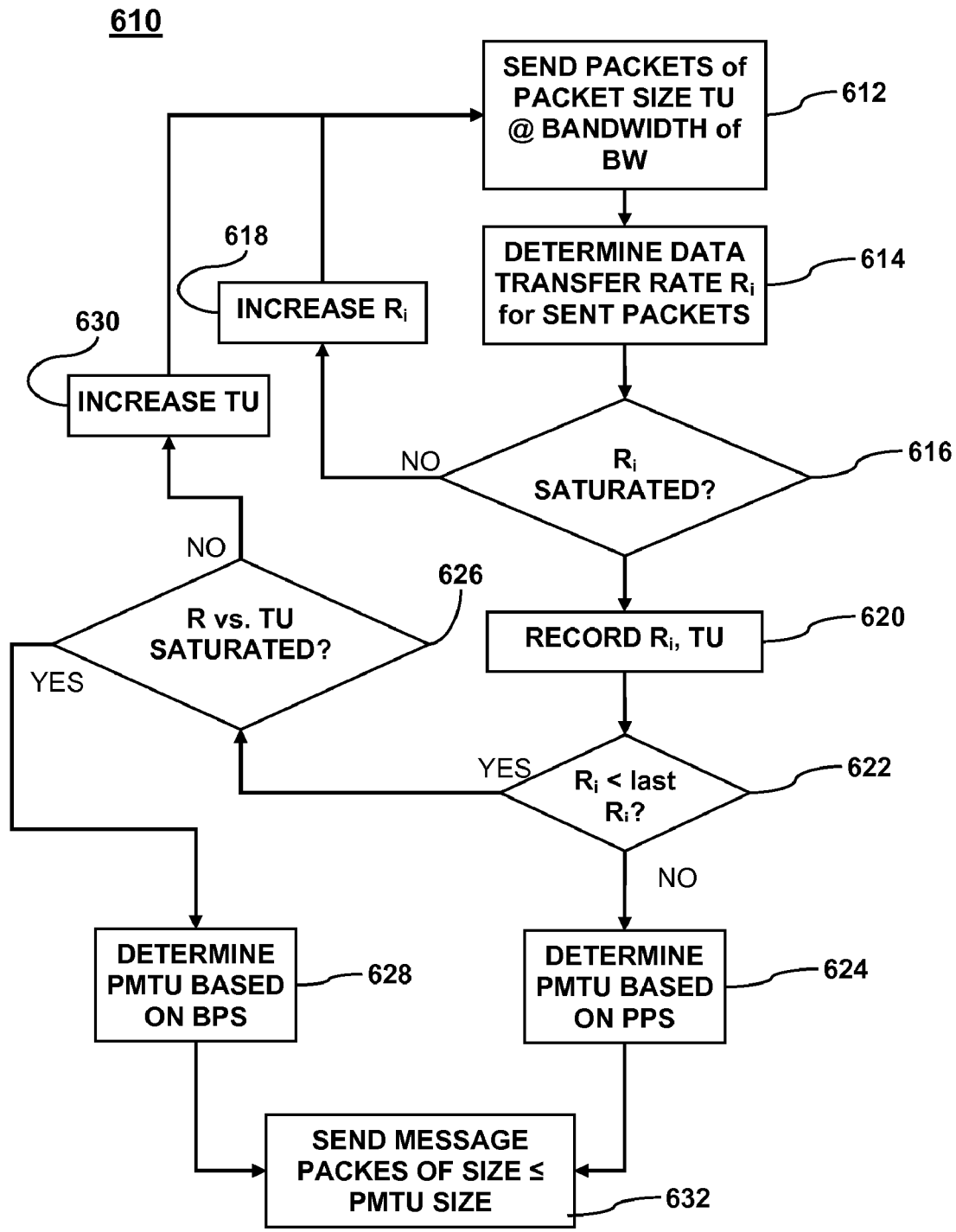
FIG. 6C is a flow diagram of a method for Path MTU discovery that may be used in conjunction with embodiments of the present invention.

Thus, based on an understanding of the two types of router behavior illustrated in FIGS. 6A-6B, path MTU discovery may proceed according to a method 610 as shown in FIG. 6C. As indicated at 612, test packets may be transmitted from one host to a recipient (e.g., from host 102 to host 104, with a small initial TU size and a small initial transmission bandwidth BW. (See FIG. 1). The DF flag for these packets is not set so that routers along the path 103 may fragment the packets normally, if they are configured to do so. As the packets are received, the transmitting host determines the data transfer rate for the packets, as indicated at 614. By way of example, each packet may include a request for the receiving host to send back a message that indicates the data transfer rate R for the test packet. The sending host probes for saturation behavior at 616. If saturation is not observed, the transmission bandwidth BW is gradually increased with the same TU size at 618, while probing packet loss and growth of delay at receiver side. When significant packet loss or growth of delay is detected, it may be assumed that the bandwidth with the TU size is saturated. The values of TU and R may be recorded at this point as indicated at 620. The TU size may then be increased, e.g., by 50% of the initial TU size. If the bandwidth is pps limited, it is expected that the bandwidth will grow linearly with TU size until the TU size (or an integer multiple thereof) is reached. If the TU size exceeds the actual path MTU size and the bandwidth is pps-limited, the receiver will detect that the data transfer rate is less than for the previous TU size. The example in FIG. 5A shows how the data transfer rate may behave when the TU size exceeds the actual path MTU size. When TU size exceeds the path MTU size, an intermediary node that has the MTU size set will start fragmenting long packets to fit them into the MTU size. This causes an increase in the number of packets, and a consequent decrease in the transfer rate since the bandwidth is pps limited. Specifically, just above the MTU size, the packets are split into two, which results in a drop in data transfer rate by one half Just above twice the MTU size the packets are split into three, which results in a drop in data transfer rate by one third. Just above three times the MTU size the packets are split into four, which results in a drop in data transfer rate by one fourth. By detecting this bandwidth drop, network applications can detect the path MTU size to maximize available bandwidth.

If the bandwidth is bps limited, by contrast, the bandwidth will tend to grow until it reaches a bandwidth saturation level, e.g., as shown and described above with respect to FIG. 6B. The data transfer rate for a bps-limited tends to flatten off without the characteristic drops seen in FIG. 6A. Thus, it is possible to determine router behavior and path MTU size by observing the dependence of data transfer rate R on TU size. By way of example, after each R and TU value has been recorded at 620 the sending host may check at 622 to determine if the latest value of R is less than the previous value of R. If so, the path MTU may be determined from the behavior of R versus TU at 624 based on a packet-rate limit assumption. If saturation of R as a function of TU (e.g., as shown in FIG. 6B) is detected at 626, the path MTU may be calculated based on a bit-rate limit assumption at 628. If such saturation behavior is not detected, the TU may be increased at 630 and the process may repeat at 612, 614, 616, etc. Once the Path MTU size has been determined, message packets of a size less than or equal to the Path MTU size may be sent over the path 103 to the second host 104, as indicated at 632. It is noted that the host that performs the path MTU discovery need not be one that sends the message packets. For example, if two or more hosts are connected to the second host 104 by the same path 103 it is possible for one of these hosts to perform path MTU discovery and notify another of these host of the path MTU. Any of these hosts may then send message packets that are less than or equal to the path MTU size over the path 103. Additional details of path MTU discovery are disclosed in commonly-assigned U.S. patent application Ser. No. 11/755,693 to Yutaka Takeda, James Marr, and Payton White entitled "NETWORK COMMUNICATION WITH PATH MTU SIZE DISCOVERY", which has been incorporated herein by reference.

It is noted that the total time to estimate the initial bandwidth (referred to herein as the "total seek time") may depend on whether the network path is packet rate limited or bit rate limited. Table II below illustrates an example of Total Seek Time Estimation for bandwidth limited and packet rate limited paths. In this example, it was assumed that the sending rate increased by 20% every second. Once saturation was reached for an initial TU size, the TU size was increased as shown in Table II. The times shown in the table are the times for saturation for each TU size for the bit rate limited and packet rate limited cases.

TABLE II

| Rate type | TU size | | | |
| --- | --- | --- | --- | --- |
| | 480 | 720 | 1080 | 1400 |
| Packet-limit | 5 sec | 4 sec | 3 sec | 3 sec |
| Byte-limit | 11 sec | 2 sec | 2 sec | 2 sec |

By adding up the saturation times it may be deduced that for the packet-rate limited case the Total Seek time is approximately 15 seconds and the Total Seek time for the bit rate limited case is approximately 17 seconds.

Dynamic Bandwidth Adjustment

Figure 7:
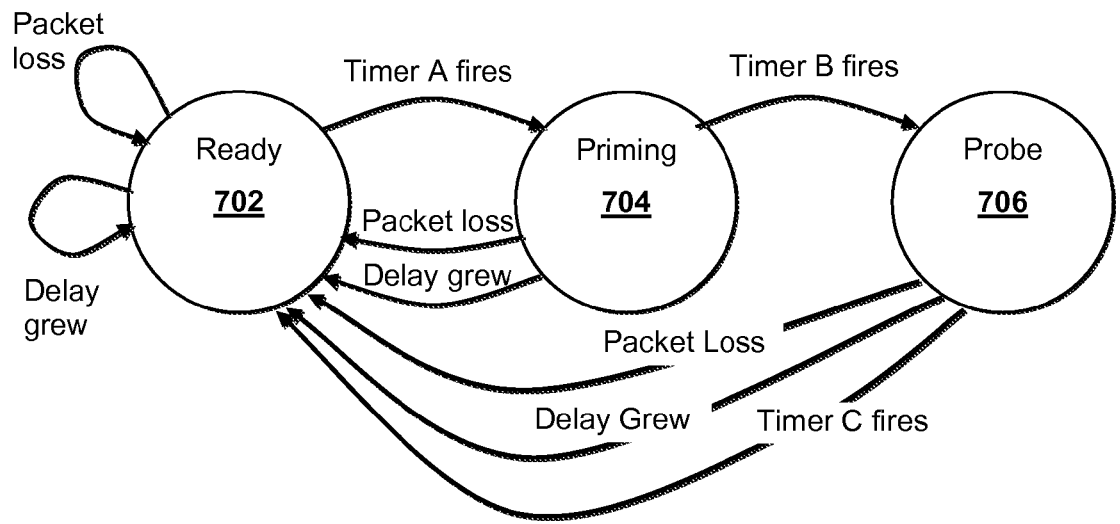
FIG. 7 is a schematic diagram of a network illustrating a computer software for implementing dynamic bandwidth adjusting according to an embodiment of the present invention.

According to embodiments of the present invention, bandwidth measurement may be utilized for dynamic bandwidth adjustment. By way of example, a node implementing dynamic bandwidth adjustment may be operated in one of three states. Specifically, as shown in FIG. 7 in a "Ready" state 702, the node sends data at an initial bandwidth rate without padding. If the node observes packet loss or growth in delay, the node may remain in the Ready state 702. If not, after a first predetermined time, e.g., as determined by a first timer A, the node may transition to a "Priming" state 704. In the Priming state 704 the node adds padding to data that it sends. If the node observes packet loss or growth in delay with the padded traffic, the node may return to the Ready state 702. Otherwise, after a second predetermined time, e.g., as determined by a second timer B, the node may transition to a "Probe" state 706. In the "Probe" state, the node may add padding while increasing a sending rate of the padded data. If the node observes packet loss or growth of delay in the padded traffic with increased sending rate, the node may return to the Ready state 702. Furthermore, even if packet loss or growth of delay are not observed, the node may return to the Ready state 702 after a third predetermined time, e.g., as determined by a third timer C. It is noted that the timers A, B, C may be implemented in hardware, in software, in firmware or some combination of two or more of hardware, software and firmware.

Figure 8:
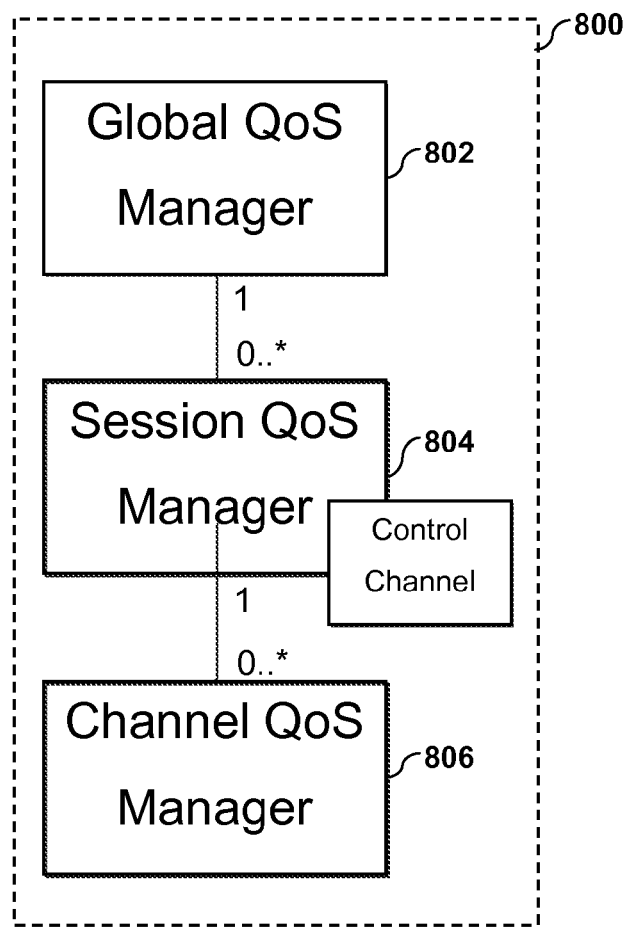
FIG. 8 is a block-level diagram illustrating a computer software for implementing global bandwidth management module in conjunction with embodiments of the present invention.

According to an embodiment of the invention, the node may be programmed to implement a three tier quality of service (QoS) bandwidth management module. By way of example, as shown in FIG. 8, a bandwidth management module 800 may include a Global QoS Manager 802, a Session QoS manager 804, and a Channel QoS manager 806. The Global QoS Manager 802 manages global bandwidth usage. The Global QoS Manager 802 may need to be aware of network topology as may be seen in the idea of a "Correlativity Index" with which the Global QoS 802 manager deals with network topology by looking at traffic characteristic dependencies between remote nodes. The Global QoS manager 802 is responsible for distributing bandwidth among different sessions running on the node 800.

The Session QoS Manager 804 is responsible for managing end-to-end QoS between the node on which it is implemented and one or more remote nodes. By way of example, and without limitation, the Session QoS manager 804 may be configured to perform MTU size discovery and rate limit type discovery, e.g., as set forth above with respect to FIGS. 6A-6C. The Session QoS manager 804 may be configured to distribute available bandwidth among different communication channels for a given session. Such bandwidth distribution may be implemented, e.g., as described in commonly-assigned U.S. Provisional Patent Application 60/992,295 to James E. Marr, Yutaka Takeda, Attila Vass, Payton White and Stephen C. Detwiler entitled "NETWORK TRAFFIC PRI- ORITIZATION", filed the same day as the present application, which has been incorporated herein by reference. The Session QoS manager 804 may be configured to facilitate communication between the node 800 and one or more remote nodes.

The Channel QoS Manager 806 may be configured to implement media-specific policy controls for the node 800. Examples of such controls include fragmentation and/or defragmentation, queuing, scheduling, policy management and bandwidth usage management and bandwidth usage management. It is noted that in FIG. 8, the numbers 1, 0 . . . * between the Global QoS Manager 802 and the Session QoS Manager 804 and between the Session QoS Manager 804 and the Channel QoS Manager 806 indicate multiplicity of each end's component. For example, A Global QoS Manager 802 handles 0 or more Session QoS Managers 804, etc.

As an example of Global Bandwidth Management, consider a shared bandwidth situation in which bandwidth available for one session grows while bandwidth available for another session is shrinking. The available bandwidth may be dedicated. In such a situation it is useful to detect correlativity between the bandwidth dedication and the session. It is therefore desirable to detect such correlativity. "Session" information, such as whether a session involves a direct connection or via a proxy server or a relay server, is not useful because bottle necks may be present at locations other than a proxy or a relay server, (e.g., an ADSL uplink.) Furthermore, it is also desirable to address outgoing bandwidth distribution. Existing bandwidth measurement schemes, however, only determine inbound bandwidth saturation.

According to an alternative Bandwidth Correlativity may be detected for communication over a network between a "local" node and a "target" node utilizing three traffic states: a Ready state, a Priming state and a Probing state. In the Ready state, a node may send variable bit rate traffic at current sending rate. In the Priming state the node may add padding and send padded data at a constant bit rate with the current sending rate. In the Probing state, the node may send padded data at a constant bit rate with an increased sending rate. The correlativity detection may proceed as follows. Initially, all nodes within a group of nodes may start sending padded traffic. Subsequently, only the "target" node raises its sending rate. The target node observes reception quality degradation of the other nodes. To determine correlativity among outgoing sessions the target node may send padded traffic to all its remote nodes and observe reception quality of those nodes.

Figure 9A:
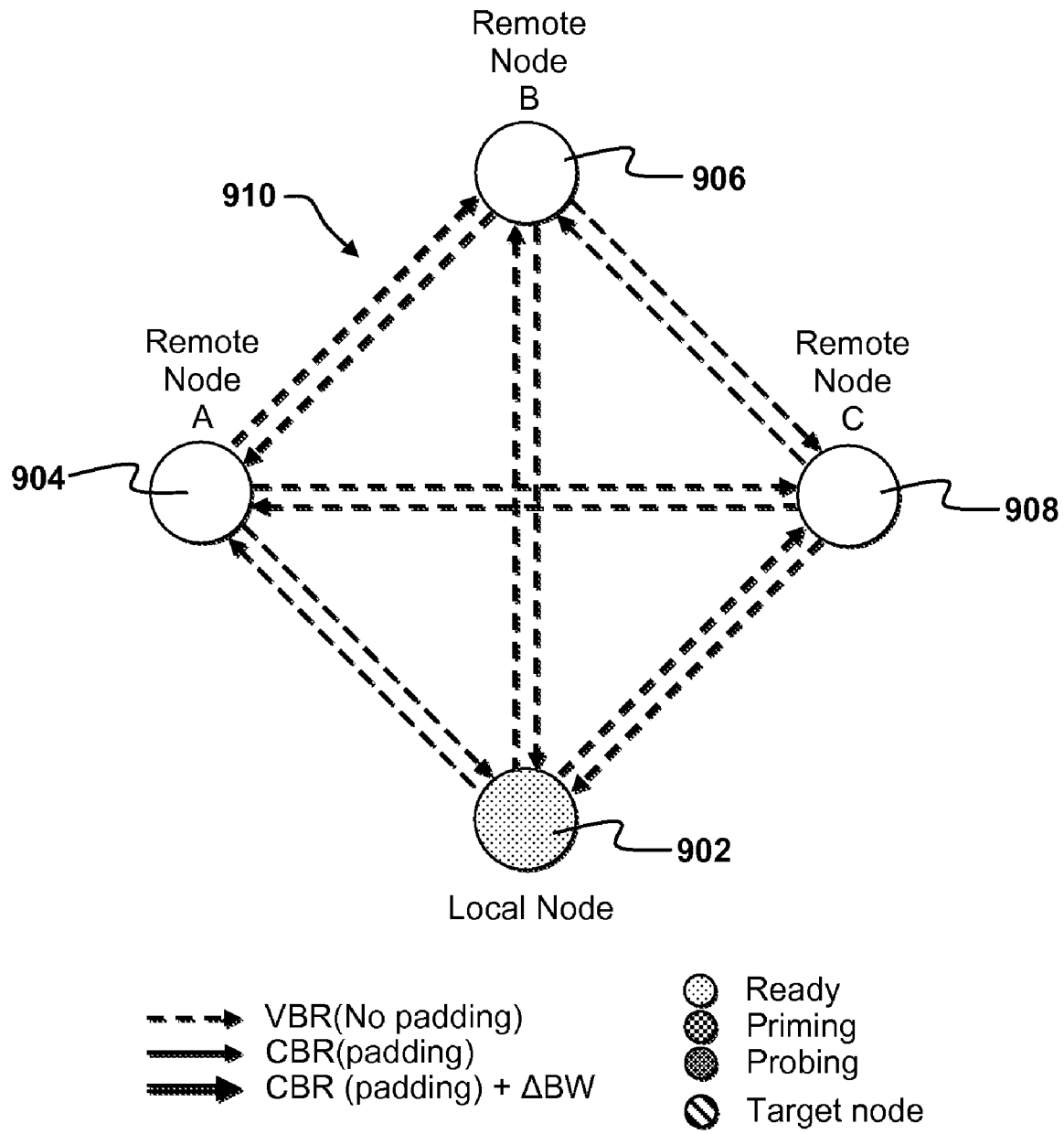
FIGS. 9A-9C are a series of schematic diagrams illustrating bandwidth correlativity detection in conjunction with embodiments of the present invention.
Figure 9B:
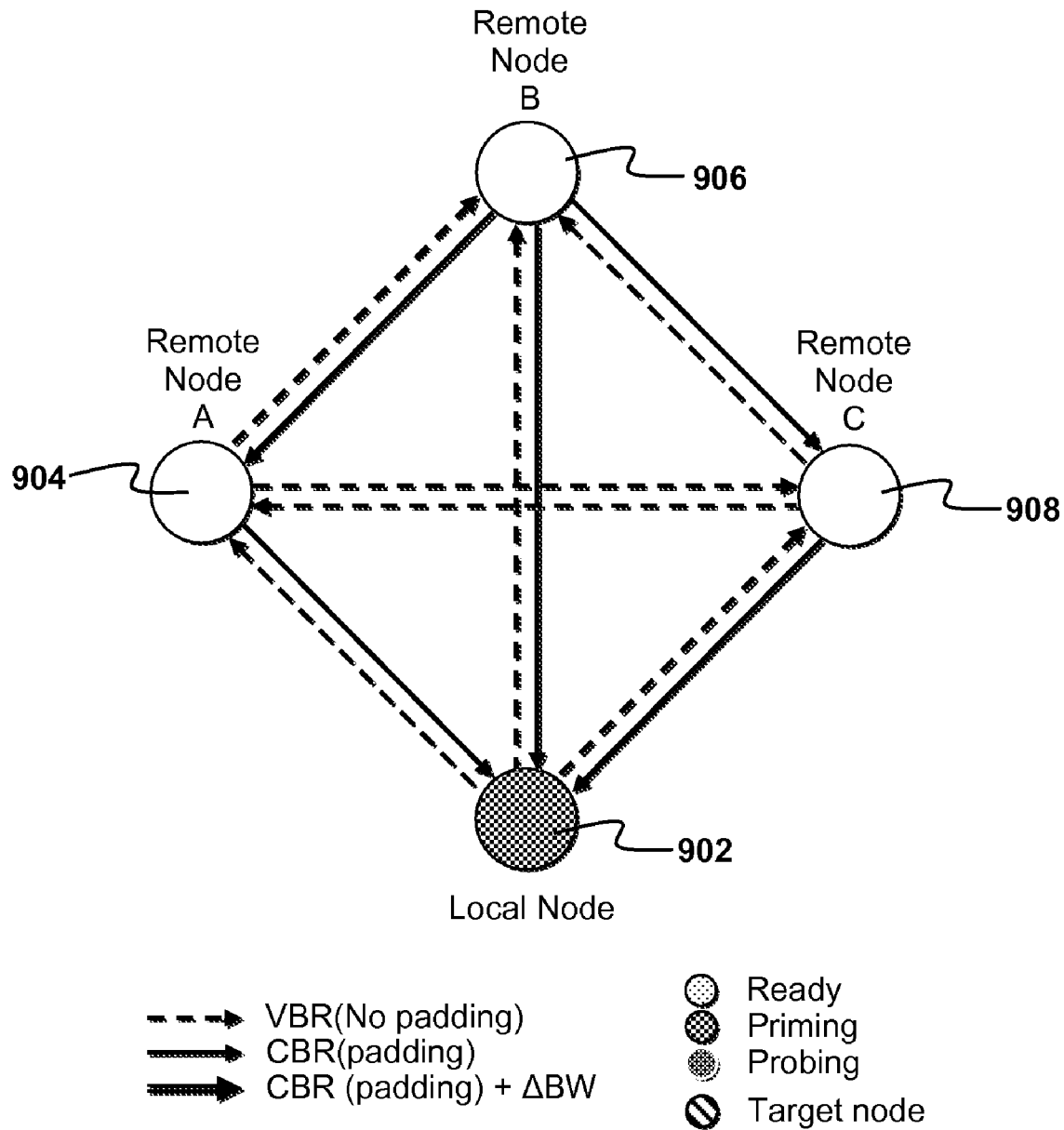
Figure 9C:
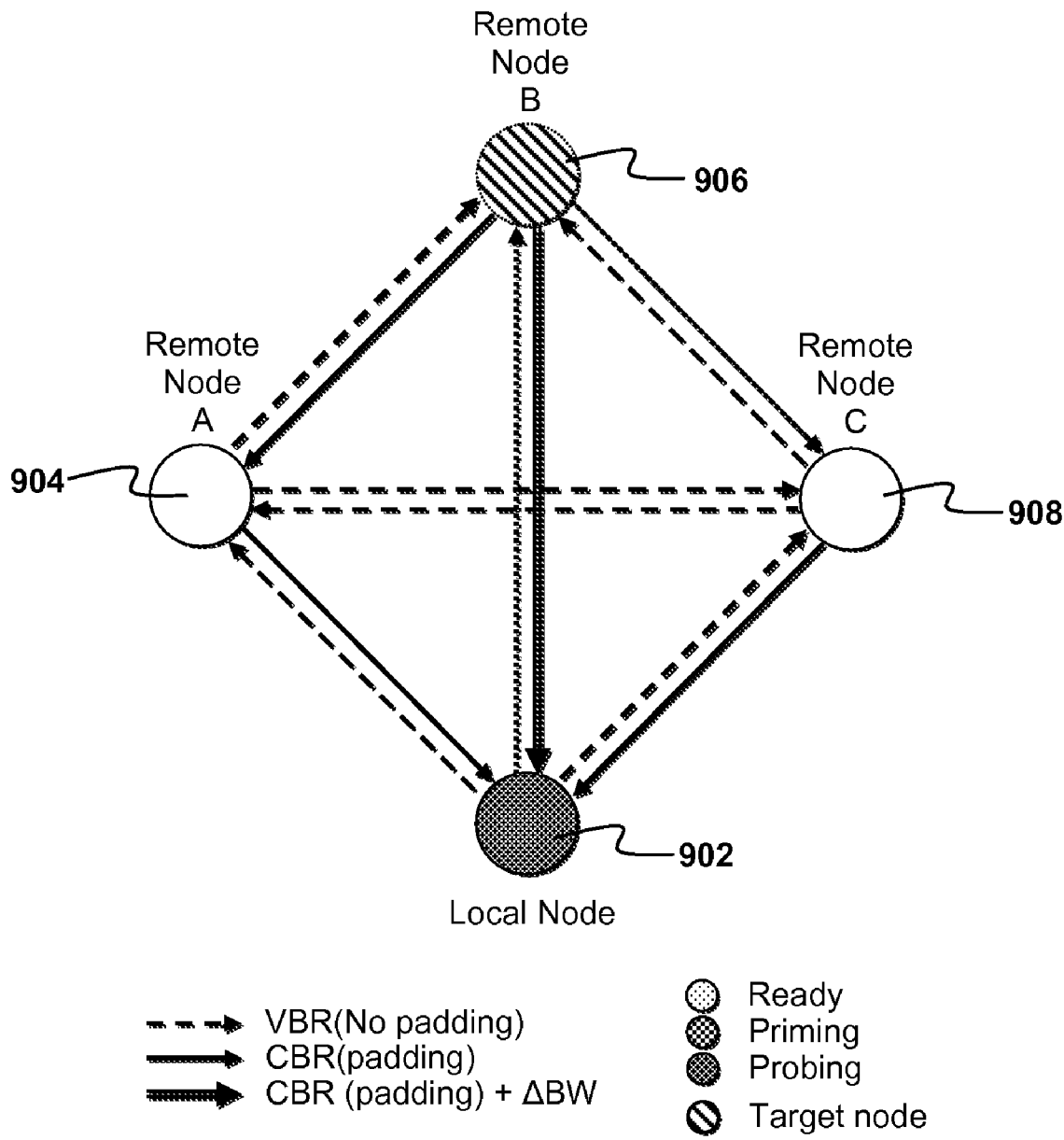

An example of the detection procedure may be understood with reference to FIGS. 9A-9C. In this example, a local node 902 and remote nodes 904, 906 and 908 may communicate with each other over a network 910. Initially, as depicted in FIG. 9A, the local node 902 and remote nodes 904, 906 and 908 are all in the 'Ready' state. The local node 902 exchanges unpadded variable bitrate data with remote node 904, remote node 906, and remote node 908. The local node 902 may transition to a 'Priming' state when a timer fires, e.g., as described above with respect to FIG. 7.

In the priming state, the local node 902 may designate one or more of the remote nodes as target nodes. By way of example, as seen in FIG. 9B, the local node 902 may designate remote node 906 as a target node. In the Priming state, the remote nodes 904, 906 and 908 may send padded traffic to the local node. In addition, the target node 906 may send padded traffic to all of its remote nodes, e.g., the local node 902, node 904, and node 908. In this example, correlativity is not detected in the Priming state. However, if packet loss or delay occurs, the sending rate may be reduced based on considerations of bandwidth correlativity learnt in the past, and the local node 902 may transition back to 'Ready' state. Specifically, if any target node's outgoing sessions is seen to be degraded (e.g., as reported by the target node's destinations), the local node may go back to the 'Ready' state. If no reception quality degradation is observed, the local node 902 may transition to the 'Probing' state.

By way of example, the local node 902 may 'Probe' target Node 906, as shown in FIG. 9C. Specifically, target Node 906 starts sending traffic at an increased rate and the local node 902 observes the reception quality for the traffic. In addition, Node 906 may check reception quality at remote Node 904 and remote Node 908. If packet loss or delay occurs in a non-target session, it may be considered to be correlative with the target session. As used herein a "target" session refers to a session involving communication between the local node and the target node and a "non-target" session refers to a session involving any other communication among the nodes. It is noted that packet loss or delay may be caused by other reasons. Therefore, it may be desirable to calculate the correlativity using a statistical approach.

By way of example, in a statistical approach the correlativity index (CRI) may be calculated by the total number of affected count divided by the total number of probes failed. More specifically, if the local node 902 is probing targeting node B 906, then the local node 902 may see reception quality degradation from node A 904. The local node 902 may add +1 to the affected count and +1 to the probe_failure_count. If affected_count is 8 and the number of probing failure is 10, then CRI between node A 904 and node B 906 will be 0.8, for example. In some implementations there may be a limitation to the maximum number of probing failure count as 20, in order to get CRI relatively up to current. In other words, a node may be configured such that it remembers the number of affected count for last 20 probing failures.

A similar correlativity check may be performed for the up-link at the target node 906. If any of the receiving nodes see quality degradation on padded sessions, a previous sending rate may be restored.

It is noted that FIGS. 9A-9C illustrate an example in which a single local node probes a target node. Embodiments of the present invention may also allow for simultaneous 'Probing' of different nodes. Simultaneous 'Probing' may be allowed if target nodes do not collide, i.e., if two local nodes choose the same target node. In such situations, the target node may be assigned to one of the local nodes on a first-come-first-served basis. If the same target is chosen by two different local nodes, the later probing node must abort (skip) it.

In embodiments of the present invention, correlativity may be measured based on a Correlativity Index (CRI). As an example of CRI, consider a situation in which a given node implements three sessions A, B and C. As used herein a "session" refers to an instance of interface with a particular application by a node.

In general the correlativity index (CRI) between any pair of sessions may range between 0 (if one of the sessions is dedicated) and 1 (if the sessions are shared). By way of example, the correlativity index CRI may be calculated as follows:

$$CRI = affected\_count / probe\_failure\_count;$$

The affected_count and probe_failure_count may be understood by reference to an example. If the local node 902 is probing with node B 906 as a target and if reception quality from node A 904 was seen degraded, it may be surmised that node A 904 was affected by the increase in traffic to node B 906 (affected count is incremented by +1) and consequently the probing fails (probe_failure_count is incremented by +1). Therefore, if this is the first failure, then CRI between node A

904 and node B 906 will be 1/1=1.0. If 10 probing failures, targeting node B 906, were experienced and 8 were caused by reception quality degradation from node A 904, then CRI between node A 904 and node B 906 will be evaluated as 8/10=0.8.

By way of example, and without loss of generality, Table III illustrates an example of correlativity relationships for the sessions A, B and C.

TABLE III

| | Correlativity Index (CRI) | | |
|---|---|---|---|
| | A | B | C |
| A | (1.0) | 0.8 | 0.0 |
| B | 0.8 | (1.0) | 0.0 |
| C | 0.0 | 0.0 | (1.0) |

In this example, no two different sessions are shared, but sessions A and B are correlated with each other while sessions A and C and B and C are not. Note the CRI values of 1.0 for correlativity between a given session and itself.

The correlativity indexes of Table III may be used to adjust sending rates if degradation in reception quality is observed during the course of communication between two nodes. For example, if session B experiences reception quality degradation, session B's sending rate may be reduced by an amount $\Delta BW_B$. In addition session A's bandwidth may also be reduced by an amount $-\Delta BW_A$ that depends on the CRI between session A and session B. By way of example:

$$-\Delta BW_A = 0.8/(0.8+1.0)*(-\Delta BW_B).$$

It is noted that in this example, if session C experiences reception quality degradation, only C's sending rate will be reduced.

Figure 10:
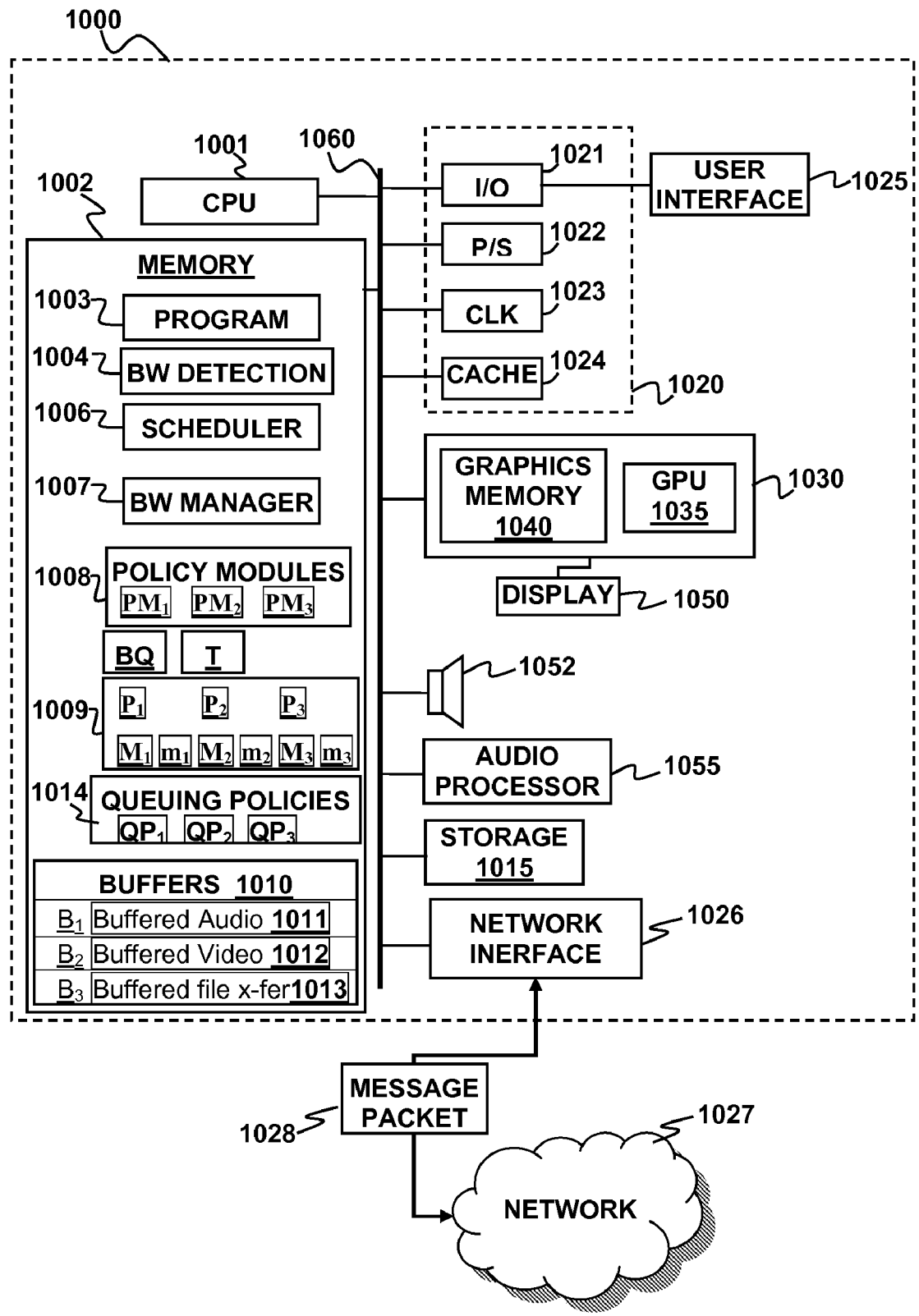
FIG. 10 is a block diagram of a node configured to implement network bandwidth detection and distribution according to an embodiment of the present invention.

FIG. 10 is a block diagram illustrating the components of a node 1000 suitable for implementing network traffic prioritization according to an embodiment of the present invention. By way of example, and without loss of generality, the node 1000 may be implemented as a computer system, such as a personal computer, video game console, personal digital assistant, or other digital device, suitable for practicing an embodiment of the invention. The node 1000 may include a central processing unit (CPU) 1001 configured to run software applications and optionally an operating system. The CPU 1001 may include one or more processing cores. By way of example and without limitation, the CPU 1001 may be a parallel processor module, such as a Cell Processor. An example of a Cell Processor architecture is described in detail, e.g., in *Cell Broadband Engine Architecture*, copyright International Business Machines Corporation, Sony Computer Entertainment Incorporated, Toshiba Corporation Aug. 8, 2005 a copy of which may be downloaded at http://cell.s-cei.co.jp/, the entire contents of which are incorporated herein by reference.

In the node 1000 a memory 1002 may be coupled to the CPU 1001. The memory 1002 may store applications and data for use by the CPU 1001. The memory 1002 may be in the form of an integrated circuit, e.g., RAM, DRAM, ROM, and the like). A computer program 1003 may be stored in the memory 1002 in the form of instructions that can be executed on the processor 1001. The instructions of the program 1003 may be configured to implement, amongst other things, one or more applications. By way of example and without loss of generality, the program 1003 may include an application, such as an A/V chat application involving two or more channels of communication. Such channels may include, but are not limited to an audio channel $C_1$, a video channel $C_2$ and a file transfer channel $C_3$. The memory 1002 may also contain instructions, that, when executed by the CPU 1001 implement a bandwidth detection module 1004, which is responsible for estimating the available bandwidth for communication with the other nodes as described hereinabove. In particular, the bandwidth detection module 1004 may implement initial bandwidth estimation, path MTU size determination as described above with respect to FIGS. 6A-6C, and bandwidth adjustment as described above with respect to FIG. 7. In addition, the bandwidth detection module 1004 may implement dynamic bandwidth adjustment, e.g., using the Ready, Priming and Probing states as described above with respect to FIGS. 9A-9C. Furthermore, the memory 1002 may also contain instructions, that, when executed by the CPU 1001 implement a bandwidth management module 1007, which may implement a Global QoS Manager, Session QoS manager and Channel QoS manager as described above with respect to FIG. 8.

The memory 1002 may also contain instructions configured to implement a scheduler 1006, which may be programmed with instructions that implement prioritizing of network traffic. Examples of such network traffic prioritization are described in detail in commonly-assigned U.S. Provisional Patent Application No. 60/992,295, to James E. Marr, Yutaka Takeda, Attila Vass, Payton White and Stephen C. Detwiler entitled "NETWORK TRAFFIC PRIORITIZATION", filed the same day as the present application, which has been incorporated herein by reference.

The memory 1002 may also contain instructions configured to implement one or more policy modules 1008 that assign priorities for distribution of bandwidth by the scheduler 1006. By way of example and without loss of generality, the policy modules 1008 may include an audio policy module $PM_1$ for the audio channel $C_1$, a video policy module $PM_2$ for the video channel $C_2$, and a file transfer policy $PM_3$ for the file transfer channel $C_3$. Examples of such policy modules are described in detail in commonly-assigned U.S. Provisional Patent Application No. 60/992,295, to James E. Marr, Yutaka Takeda, Attila Vass, Payton White and Stephen C. Detwiler entitled "NETWORK TRAFFIC PRIORITIZATION", which has been incorporated herein by reference.

The memory 1002 may contain data that is generated by or usable by the program 1003, bandwidth module 1004, scheduler 1006, and policy modules 1008. Specifically, such data may include, but is not limited to policy module parameters 1009, a bandwidth quantum BQ and a time quantum T. The policy module parameters 1009 may include priorities $P_1$, $P_2$, and $P_3$ respectively associated with the audio channel $C_1$, video channel $C_2$, and file transfer channel $C_3$. The policy module parameters 1009 may further include minimum values $m_1$, $m_2$ and $m_3$ respectively associated with the audio channel $C_1$, video channel $C_2$ and file transfer channel $C_3$ as well as maximum values $M_1$, $M_2$ and $M_3$ respectively associated with the audio channel $C_1$, video channel $C_2$ and file transfer channel $C_3$.

In addition, the memory 1002 may be configured to include one or more buffers 1010 for data generated by the program 1003 for transmission via the communication channels. By way of example and without loss of generality, the buffers 1010 may include an audio buffer $B_1$ configured to buffer audio channel data 1011, a video buffer $B_2$ configured to buffer video channel data 1012 and a file transfer buffer $B_3$ configured to buffer file transfer channel data 1013. The scheduler 1006 may be configured, e.g., by appropriate programming, to implement buffering of data in accordance with one or more queuing policies 1014. By way of example, and without loss of generality, the queuing policies 1014 may include an audio data queuing policy $QP_1$, a video data queuing policy $QP_2$ and a file transfer queuing policy $QP_3$. The queuing policies 1014 may be configured, to determine what happens when multiple sends are made on a single channel, but cannot all be sent immediately, e.g., as described in commonly-assigned U.S. Provisional Patent Application No. 60/992,295, to James E. Marr, Yutaka Takeda, Attila Vass, Payton White and Stephen C. Detwiler entitled "NETWORK TRAFFIC PRIORITIZATION".

The node 1000 may further include a storage device 1015 that provides non-volatile storage for applications and data. By way of example, the storage device 1015 may be a fixed disk drive, removable disk drive, flash memory device, tape drive, CD-ROM, DVD-ROM, Blu-ray, HD-DVD, UMD, or other optical storage devices. The node 1000 may also include well-known support functions 1020 commonly used in computing systems. Such support functions may include such features as input/output (I/O) elements 1021, power supplies (P/S) 1022, a clock (CLK) 1023 and cache 1024.

One or more user input devices 1025 may be used to communicate user inputs from one or more users to the node 1000. By way of example, one or more of the user input devices 1025 may be coupled to the node 1000 via the I/O elements 1021. Examples of suitable input devices 1025 include keyboards, mice, joysticks, touch pads, touch screens, light pens, still or video cameras, and/or microphones. In the particular case of A/V chat, it is desirable for the user interface devices 1025 to include both a camera and a microphone. A network interface 1026 allows the node 1000 to communicate with other computer systems via an electronic communications network 1027. The network interface 1026 may include wired or wireless communication over local area networks and wide area networks such as the Internet. The node 1000 may send and receive data and/or requests for files via one or more message packets 1028 over the network 1027.

The node 1000 may further comprise a graphics subsystem 1030, which may include a graphics processing unit (GPU) 1035 and graphics memory 1040. The graphics memory 1040 may include a display memory (e.g., a frame buffer) used for storing pixel data for each pixel of an output image. The graphics memory 1040 may be integrated in the same device as the GPU 1035, connected as a separate device with GPU 1035, and/or implemented within the memory 1002. Pixel data may be provided to the graphics memory 1040 directly from the CPU 1001. Alternatively, the CPU 1001 may provide the GPU 1035 with data and/or instructions defining the desired output images, from which the GPU 1035 may generate the pixel data of one or more output images. The data and/or instructions defining the desired output images may be stored in buffers 1010 and/or graphics memory 1040. In an embodiment, the GPU 1035 may be configured (e.g., by suitable programming or hardware configuration) with 3D rendering capabilities for generating pixel data for output images from instructions and data defining the geometry, lighting, shading, texturing, motion, and/or camera parameters for a scene. The GPU 1035 may further include one or more programmable execution units capable of executing shader programs.

The graphics subsystem 1030 may periodically output pixel data for an image from graphics memory 1040 to be displayed on a display device 1050. The display device 1050 may be any device capable of displaying visual information in response to a signal from the computer system 1000, including CRT, LCD, plasma, and OLED displays. The node 1000 may provide the display device 1050 with an analog or digital signal. By way of example, the display 1050 may include a cathode ray tube (CRT) or flat panel screen that displays text, numerals, graphical symbols, or images. In addition, the node 1000 may include one or more audio speakers 1052 that produce audible or otherwise detectable sounds. To facilitate generation of such sounds, the node 1000 may further include an audio processor 1055 adapted to generate analog or digital audio output from instructions and/or data provided by the CPU 1001, memory 1002, and/or storage 1015. In the particular case of A/V chat, it is desirable for the node 1000 to include a graphical display device 1050 and an audio speaker 1052.

The components of the node 1000, including the CPU 1001, memory 1002, support functions 1020, data storage 1015, user input devices 1025, network interface 1026, graphics subsystem 1030, speaker 1052 and audio processor 1055 may be operably connected to each other via one or more data buses 1060. These components may be implemented in hardware, software, firmware or some combination of two or more of these.

By way of example, and without loss of generality, software designers may implement embodiments of the present invention in software applications by creating a plurality of communication channels, and assigning a priority and a queuing policy to each one. Data could then be sent through these configured communication channels and the scheduler 1006, policy modules 1008, and queuing policies 1014 may control the actual transmission of the data over the network 1027.

Embodiments of the present invention may avoid unfair bandwidth distribution during communication between nodes over a network. Serialization for probing operation is not required in order to implement such embodiments. In addition, the three-state congestion control (Ready, Priming and Probe) described above has been tested and shown to work very well. For example, in a situation involving 3-way A/V chat, involving three nodes, this three-state congestion control worked well adjusting sending rate and fairly distributing available bandwidth. Bandwidth distribution tended to stabilize in about 10 to 20 seconds after a new party joined the chat session.

While the above is a complete description of the preferred embodiment of the present invention, it is possible to use various alternatives, modifications and equivalents. Therefore, the scope of the present invention should be determined not with reference to the above description but should, instead, be determined with reference to the appended claims, along with their full scope of equivalents. Any feature described herein, whether preferred or not, may be combined with any other feature described herein, whether preferred or not. In the claims that follow, the indefinite article "A" or "An" refers to a quantity of one or more of the item following the article, except where expressly stated otherwise. The appended claims are not to be interpreted as including means-plus-function limitations, unless such a limitation is explicitly recited in a given claim using the phrase "means for."

What is claimed is:

1. In a node configured to communicate with one or more other nodes over a network, a method for distributing available bandwidth for network traffic among two or more distinct channels of communication within a single application running on the node, the method comprising:
   a) detecting an available bandwidth for communication between the first node and a second node;
   b) determining a distribution for the available bandwidth among the two or more communication channels;
   c) adjusting a sending rate for data sent from the first node to the second node over one or more of the two or more communication channels in response to a detected change in the available bandwidth; and
d) determining a maximum transmission unit (MTU) size in a network path between the first and second nodes by
   i) sending a plurality of test packets of varying transmission unit (TU) size from the first host to the second host, wherein a "do not fragment" (DF) flag for the test packets is not set;
   ii) determining whether one or more of the test packets were received by the second hose;
   iii) calculating an estimated path MTU size for a network path between the first and second hosts based on one or more patterns of receipt of the test packets by the second host, wherein the path MTU size is determined differently if the network path is bit-rate limited than if the network path is packet rate limited; and
   iv) sending one or more message packets of a size less than or equal to the estimated path MTU size over the network path.

2. The method of claim 1 wherein a) includes:
sending one or more message packets from the first node to the second node;
receiving a sending rate from the second node in response to the one or more message packets; and
sending data from the first node to the second node at the sending rate.

3. The method of claim 1 wherein a) includes
detecting a traffic status with the second node in response to one or more message packets received from the first node;
sending a request from the first node to the second node, wherein the request includes a sending rate for the first node to send message packets to the second node, wherein the sending rate is determined from the traffic status.

4. The method of claim 1 wherein a) includes detecting saturation of the available bandwidth.

5. The method of claim 1, further comprising padding the available bandwidth during communication between the first node and the second node.

6. The method of claim 1, wherein c) includes dynamically adjusting the sending rate for data sent from the first node to the second node.

7. The method of claim 6, wherein dynamically adjusting the sending rate includes:
   i) determining an initial bandwidth for communication between the first and second nodes;
   ii) sending one or more message packets from the first node to the second node at a constant sending rate less than or equal to the initial bandwidth, wherein the one or more message packets include data and padding; and
   iii) increasing the constant bandwidth, if packet loss or growth of delay is not detected for the one or more message packets.

8. The method of claim 7, further comprising decreasing the constant bandwidth, if packet loss or growth of delay is detected for the one or more message packets.

9. The method of claim 1, wherein c) includes determining one or more correlativity indexes between one or more sessions involving communication between the first and second nodes and adjusting the sending rate based on the one or more correlativity indexes.

10. The method of claim 9, wherein adjusting the sending rate based on the one or more correlativity indexes includes reducing a sending rate for a first session by a first amount and adjusting a sending rate for a second session by a second amount that depends on the first amount and a correlativity between the first session and the second session.

11. The method of claim 9, wherein determining one or more correlativity indexes includes performing a computation involving a ratio of number of probe failures due to packet loss to a total number of probe failures.

12. A node configured to communicate with one or more other nodes over a network and distribute available bandwidth for network traffic among two or more distinct channels of communication within a single application running on the node, the node comprising:
a) means for detecting an available bandwidth for communication between the first node and a second node;
b) means for determining a distribution for the available among the two or more communication channels;
c) means for adjusting a sending rate for data sent from the first node to the second node over one or more of the two or more communication channels in response to a detected change in the available bandwidth; and
d) means for determining a maximum transmission unit (MTU) size in a network path between the first and second nodes by
   i) sending a plurality of test packets of varying transmission unit (TU) size from the first host to the second host, wherein a "do not fragment" (DF) flag for the test packets is not set;
   ii) determining whether one or more of the test packets were received by the second host;
   iii) calculating an estimated path MTU size for a network path between the first and second hosts based on one or more patterns of receipt of the test packets by the second host, wherein the path MTU size is determined differently if the network path is bit-rate limited than if the network path is packet rate limited; and
   iv) sending one or more message packets of a size less than or equal to the estimated path MTU size over the network path.

13. A node configured to communicate with one or more other nodes over a network and distribute available bandwidth for network traffic among two or more distinct channels of communication within a single application running on the node, the node comprising:
a) a processor; and
b) a set of computer executable instructions operably to implement a bandwidth detection module and a bandwidth distribution module on the processor, wherein the bandwidth module is configured to:
   i) determine an available bandwidth for communication between the first node and a second node; and
   ii) adjust a sending rate for data sent from the first node to the second node over one or more of the two or more communication channels in response to a detected change in the available bandwidth; and
   iii) determine a maximum transmission unit (MTU) size in a network path between the first and second nodes by
      1) sending a plurality of test packets of varying transmission unit (TU) size from the first host to the second host, wherein a "do not fragment" (DF) flag for the test packets is not set;
      2) determining whether one or more test packets were received by the second host;
      3) calculating an estimated path MTU size for a network path between the first and second hosts based on one or more patterns of receipt of the test packets by the second host, wherein the path MTU size is determined differently if the network path is bitrate limited than if the network path is packet rate limited; and 4) sending one or more message packets of a size less than or equal to the estimated path MTU size over the network path, wherein the bandwidth distribution module is configured to manage a distribution for the available bandwidth among the two or more communication channels.

14. The node of claim 13, wherein the bandwidth distribution module includes a Global Quality of Service (QoS) manager configured to distribute available bandwidth among two or more different sessions running on the node.

15. The node of claim 13 wherein the bandwidth distribution module includes a Session Quality of Service (QoS) manager configured to manage end-to-end QoS between the node and the one or more other nodes.

16. The node of claim 13, wherein the bandwidth distribution module includes a Channel Quality of Service (QoS) manager configured to implement one or more media-specific policy controls for the node.

17. The node of claim 16 wherein the one or more media-specific controls include fragmentation and/or de-fragmentation, queuing, scheduling, policy management and bandwidth usage management.

* * * * *